United States Patent
Liu et al.

(10) Patent No.: US 11,334,648 B2
(45) Date of Patent: May 17, 2022

(54) MATRIX MULTIPLIER

(71) Applicant: HUAWEI TECHNOLOGIES CO., LTD., Guangdong (CN)

(72) Inventors: Hu Liu, Shenzhen (CN); Heng Liao, Shanghai (CN); Jiajin Tu, Shenzhen (CN); Honghui Yuan, Hangzhou (CN); Hou Fun Lam, Hong Kong (CN); Fan Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 16/915,915

(22) Filed: Jun. 29, 2020

(65) Prior Publication Data
US 2020/0334322 A1 Oct. 22, 2020

Related U.S. Application Data

(63) Continuation of application No. PCT/CN2018/111077, filed on Oct. 19, 2018.

(30) Foreign Application Priority Data

Dec. 29, 2017 (CN) .......................... 201711499179.X

(51) Int. Cl.
*G06F 17/16* (2006.01)
(52) U.S. Cl.
CPC .................................. *G06F 17/16* (2013.01)
(58) Field of Classification Search
CPC ....................................................... G06F 17/16
(Continued)

(56) References Cited

U.S. PATENT DOCUMENTS

| 10,489,479 | B1* | 11/2019 | Shalev | ................... | G06F 17/12 |
| 10,528,384 | B2* | 1/2020 | Takeshige | ............. | G06F 9/5027 |
| 10,713,214 | B1* | 7/2020 | Shalev | ................... | G06F 17/16 |

(Continued)

FOREIGN PATENT DOCUMENTS

| CN | 101086699 A | 12/2007 |
| CN | 101089840 A | 12/2007 |

(Continued)

OTHER PUBLICATIONS

Wilson Jos et al, Design of a massively parallel computing architecture for dense matrix multiplication, 2013 IEEE 4th Latin American Symposium on Circuits and Systems (LASCAS), Date of Conference: Feb. 27-Mar. 1, 2013, total 4 pages.

(Continued)

*Primary Examiner* — Tan V Mai
(74) *Attorney, Agent, or Firm* — James Anderson Harrison

(57) ABSTRACT

Embodiments of the present invention disclose a matrix multiplier, and relate to the field of data computing technologies, so as to divide two matrices into blocks for computation. The matrix multiplier includes: a first memory, a second memory, an operation circuit, and a controller, where the operation circuit, the first memory, and the second memory may perform data communication by using a bus; and the controller is configured to control, according to a preset program or instruction, a first matrix and a second matrix to be divided into blocks, and control the operation circuit to perform a multiplication operation on corresponding blocks in the first memory and the second memory based on block division results of the controller. The matrix multiplier may be configured to perform a multiplication operation on two matrices.

10 Claims, 15 Drawing Sheets

(58) Field of Classification Search
USPC .......................................................... 708/607
See application file for complete search history.

(56) References Cited

U.S. PATENT DOCUMENTS

| | | | | |
|---|---|---|---|---|
| 2019/0129719 A1* | 5/2019 | Bainville | ............ | G06F 9/30043 |
| 2020/0142949 A1* | 5/2020 | Liao | ........................ | G06F 7/523 |
| 2021/0224125 A1* | 7/2021 | Liu | ........................... | G06F 7/76 |

FOREIGN PATENT DOCUMENTS

| | | | |
|---|---|---|---|
| CN | 103902509 | A | 7/2014 |
| CN | 104346318 | A | 2/2015 |
| CN | 104636316 | A | 5/2015 |
| CN | 104899182 | A | 9/2015 |
| CN | 105589677 | A | 5/2016 |
| CN | 106445471 | A | 2/2017 |
| CN | 107315574 | A | 11/2017 |
| CN | 109213962 | A | 1/2019 |
| DE | 4036455 | C1 | 4/1992 |
| JP | H02266458 | A | 10/1990 |
| JP | H0644196 | A | 2/1994 |
| JP | H06175986 | A | 6/1994 |
| JP | 2018139045 | A | 9/2018 |
| JP | 2020537789 | A | 12/2020 |

OTHER PUBLICATIONS

Tanabe Noboru, Parallel Processing on a Massively Parallel Teraflops Machine TS/1—Interprocessor Chaining Its Applications—, Real World Computing Partnership Massively Parallel Systems TOSHIBA Laboratory, Mar. 1995, with an English Abstract, total 11 pages.

Masamitsu Hattori et al, Parallel matrix-multiplication algorithms for distributed parallel computers, Nagoya Institute of Technology, The Institute of Electronics, Information and Communication Engineers, Jun. 2000, with an English Abstract, total 10 pages.

Wenyan Lu et al, "FLexFlow: A Flexible Dataflow Accelerator Architecture for Convolutional Neural Networks", 2017 IEEE International Symposium on High Performance Computer Architecture, total 12 pages.

Ephrem Wu et al, "A High-Throughput Reconfigurable Processing Array for Neural Networks", 2017 27th International Conference on Field Programmable Logic and Applications (FPL), Oct. 5, 2017, total 4 pages.

Jiantao Qiu et al, "Going Deeper with Embedded FPGA Platform for Convolutional Neural Network", Proceedings of the 2016 ACM/SIGDA International Symposium on Field-Programmable Gate Arrays, Feb. 2016, total 10 pages.

* cited by examiner

FIG. 8

| Clock cycle | 0 | 1 | 2 | 3 | 4 | 5 | 6 |
|---|---|---|---|---|---|---|---|
| BUFA_0 | [0,R0] | [1,R0] | [2,R0] | [3,R0] | | | |
| BUFA_1 | | [0,R1] | [1,R1] | [2,R1] | [3,R1] | | |
| BUFA_2 | | | [0,R2] | [1,R2] | [2,R2] | [3,R2] | |
| BUFA_3 | | | | [0,R3] | [1,R3] | [2,R3] | [3,R3] |

| Clock cycle | 0 | 1 | 2 | 3 | 4 | 5 | 6 |
|---|---|---|---|---|---|---|---|
| BUFB_0 | [0,C0] | [1,C0] | [2,C0] | [3,C0] | | | |
| BUFB_1 | | [0,C1] | [1,C1] | [2,C1] | [3,C1] | | |
| BUFB_2 | | | [0,C2] | [1,C2] | [2,C2] | [3,C2] | |
| BUFB_3 | | | | [0,C3] | [1,C3] | [2,C3] | [3,C3] |

T = 1

|   |   |   |   |
|---|---|---|---|
| 1<br>Row 1 x<br>column 1 | 0<br>Row 1 x<br>column 2 |   |   |
| 0<br>Row 2 x<br>column 1 |   |   |   |
|   |   |   |   |
|   |   |   |   |

|   |   |   |   |
|---|---|---|---|
| 7<br>Row 1 x<br>column 1 | 6<br>Row 1 x<br>column 2 | 5<br>Row 1 x<br>column 3 | 4<br>Row 1 x<br>column 4 |
| 6<br>Row 2 x<br>column 1 | 5<br>Row 2 x<br>column 2 | 4<br>Row 2 x<br>column 3 | 3<br>Row 2 x<br>column 4 |
| 5<br>Row 3 x<br>column 1 | 4<br>Row 3 x<br>column 2 | 3<br>Row 3 x<br>column 3 | 2<br>Row 3 x<br>column 4 |
| 4<br>Row 4 x<br>column 1 | 3<br>Row 4 x<br>column 2 | 2<br>Row 4 x<br>column 3 | 1<br>Row 4 x<br>column 4 |

FIG. 14

MATRIX MULTIPLIER

CROSS-REFERENCE TO RELATED APPLICATIONS

This application is a continuation of International Application No. PCT/CN2018/111077, filed on Oct. 19, 2018, which claims priority to Chinese Patent Application No. 201711499179.X, filed on Dec. 29, 2017. The disclosures of the aforementioned applications are hereby incorporated by reference in their entireties.

TECHNICAL FIELD

The present invention relates to the field of computing technologies, and in particular, to a matrix multiplier.

BACKGROUND

Currently, a product of two matrices A and B may be computed in either of the following two manners.

Manner 1: Computation is performed by using a vector processor.

It is assumed that C=A*B and a quantity of elements that can be simultaneously computed by the vector processor is M. Referring to FIG. 1, the vector processor loads a vector in a row i (including elements $A_{i1}, A_{i2}, \ldots, A_{i(M-1)}$, and $A_{iM}$) of the matrix A into a source register Reg0, and then loads a vector in a column j (including elements $B_{j1}, B_{j2}, \ldots, B_{j(M-1)}$, and $B_{jM}$) of the matrix B into a register Reg1, so that multiplication between elements corresponding to Reg0 and Reg1 can be implemented. Finally, an accumulation operation is completed by using an adder tree, data $C_{ij}$ in a row i and a column j of a matrix C is obtained through computation, and the matrix C may be obtained by performing computation for a plurality of times.

Manner 2: To further increase a computation speed, a multiplication operation of the matrices may be completed by using a two-dimensional computation array.

For example, the two-dimensional computation array may be an N*N systolic array. In Manner 1, $N^3$ multiplication operations are required to complete a multiplication operation of two N*N matrices. Because the vector processor can compute multiplication between M elements in each clock cycle, duration required for completing one multiplication operation is $N^3/M$ clock cycles. In Manner 2, $N^3$ multiplication operations are required to complete a multiplication operation of two N*N matrices. Because the systolic array has $N^2$ operation units, duration required for completing one matrix operation is $N^3/N^2=N$ clock cycles. In both Manner 1 and Manner 2, it takes a long time to complete the multiplication operation of the N*N matrices, and this causes a relatively fixed and inflexible computing size.

SUMMARY

Embodiments of the present invention provide a matrix multiplier and a related device, so as to resolve a problem of inflexible computation and low efficiency during matrix multiplication.

According to a first aspect, an embodiment of the present invention provides a matrix multiplier, where the matrix multiplier may include:

a first memory, configured to store a first matrix, where the first matrix is an M*K matrix;

a second memory, configured to store a second matrix, where the second matrix is a K*N matrix;

an operation circuit connected to the first memory and the second memory, where the operation circuit includes operation units of X rows and Y columns, and each operation unit includes a vector multiplication circuit and an addition circuit, where the vector multiplication circuit is configured to: receive row vector data sent by the first memory and column vector data sent by the second memory, and multiply the two vectors; and the addition circuit is configured to: add results obtained by multiplying the two vectors, and accumulate computation results of a same operation unit, to obtain an operation result of each operation unit; and a controller connected to the operation circuit, where the controller is configured to perform the following actions:

dividing the first matrix into blocks in a unit of a sub-block whose size is X*L, to obtain S×R sub-blocks of a same size, where a sub-block in a row s and a column r of the S×R sub-blocks is denoted as $A_{sr}$, s=(1, 2, 3, . . . , and S), and r=(1, 2, 3, . . . , and R); and dividing the second matrix into blocks in a unit of a sub-block whose size is L*Y, to obtain R×T sub-blocks with a same size, where a sub-block in a row r and a column t in the R×T sub-blocks is denoted as $B_{rt}$, r=(1, 2, 3, . . . , and R), and t=(1, 2, 3, . . . , and T); where the controller is further configured to perform the following action:

inputting a row x in X row vectors of any sub-block $A_{sr}$ and a column y in Y column vectors of a corresponding sub-block $B_{rt}$ into an operation unit in a row x and a column y in the operation units of X rows and Y columns, so as to perform an operation, where x=(1, 2, 3, . . . , and X), y=(1, 2, 3, . . . , and Y), and r in the any sub-block $A_{sr}$ and r in the corresponding sub-block $B_{rt}$ have an equal value.

An embodiment of the present invention provides a matrix multiplier, where the matrix multiplier uses a controller to complete a matrix multiplication block division method, that is, an MNK fractal; and divide, by using control logic of an internal controller 604 in the matrix multiplier 60, a large matrix into identity matrices (to be specific, an X*L×L*Y matrix) for multiplication. The control logic of the controller 604 sends an identity matrix multiplication task to an operation circuit 603 in each clock cycle, so that data is executed in a pipeline manner, and operation units of X rows and Y columns operate in a full load state. Efficiency of matrix multiplication is increased, and an application effect of significantly improving a neural network algorithm is achieved. The matrix multiplier provided in this embodiment of the present invention may perform a convolution operation and an FC operation in a convolutional neural network.

In a possible implementation, the controller is specifically configured to perform the following action:

inputting the row x in the X row vectors of the any sub-block $A_{sr}$ and the column y in the Y column vectors of the corresponding sub-block $B_{rt}$ in parallel in a same clock cycle into the operation unit in a row x and a column y in the operation units of X rows and Y columns, so as to perform the operation.

In a possible implementation, the controller is further configured to control row vectors of the any sub-block $A_{sr}$ to successively enter, in ascending order of x row numbers, a row x corresponding to the operation units of X rows and Y columns, where a difference between moments at which adjacent row vectors enter operation units in a same column and different rows is one clock cycle; and the controller is further configured to simultaneously control column vectors of the corresponding sub-block $B_{rt}$ to successively enter, in ascending order of y column numbers, a column y corresponding to the operation units of X rows and Y columns, where a difference between moments at which adjacent column vectors enter operation units in a same row and different columns is one clock cycle.

In a possible implementation, the controller is further configured to control:

values of s and r to remain unchanged and a value of t to be changed in at least two consecutive sub-block multiplication computation cycles, so that the first memory reuses a same sub-block $A_{sr}$ within the at least two consecutive sub-block multiplication computation cycles, where the sub-block multiplication computation cycle is a time used by the operation units of X rows and Y columns to complete a matrix multiplication operation on one sub-block $A_{sr}$ and a corresponding sub-block $B_{rt}$.

In a possible implementation, the matrix multiplier further includes a third memory connected to the operation circuit; and the controller is configured to control the operation units of X rows and Y columns to store the operation results of the vector multiplication circuit and the addition circuit into the third memory.

In a possible implementation, the matrix multiplier further includes: a fourth memory connected to the first memory and the second memory, and a fifth memory connected to the third memory; and the controller is further configured to control: before performing the multiplication operation of the first matrix and the second matrix, data sources of the first matrix and the second matrix to be moved from the fourth memory to the first memory and the second memory respectively, and the computation results to be moved from the third memory to the fifth memory.

In a possible implementation, the vector multiplication circuit includes L multipliers; and the addition circuit includes an adder tree with an input quantity being L+1.

In a possible implementation, the first memory, the second memory, the operation circuit, and the controller are connected by using a bus interface unit.

In a possible implementation, $$S = \begin{cases} M/X, & M\%X = 0 \\ \left[\frac{M}{X}\right] + 1, & M\%X \neq 0 \end{cases}, \text{ and}$$

$$R = \begin{cases} K/L, & K\%L = 0 \\ \left[\frac{K}{L}\right] + 1, & K\%L \neq 0 \end{cases}; \text{ when } M\%X \neq 0,$$

computation is not performed on a row (M+1) to a row (S*X−M) of the first matrix, and a value of a result is assigned 0; and when K % Y≠0, computation is not performed on a column (K+1) to a column (R*Y−K) of the first matrix, and a value of a result is assigned 0;

In a possible implementation, $$R = \begin{cases} K/L, & K\%L = 0 \\ \left[\frac{K}{L}\right] + 1, & K\%L \neq 0 \end{cases}, \text{ and } T = \begin{cases} N/Y, & N\%Y = 0 \\ \left[\frac{N}{Y}\right] + 1, & N\%Y \neq 0 \end{cases};$$

when K % Y≠0, computation is not performed on a column (K+1) to a column (R*Y−K) of the first matrix, and a value of a result is assigned 0; and when N % X≠0, computation is not performed on a row (N+1) to a row (T*X−N) of the first matrix, and a value of a result is assigned 0.

In a possible implementation, the matrix multiplier further includes a direct memory access unit, where the direct memory access unit is configured to: perform a matrix transpose operation on the first matrix before moving the first matrix to the first memory, or perform a matrix transpose operation on the second matrix before moving the second matrix to the second memory.

In a possible implementation, the controller controls any sub-block in the first matrix to be stored into the first memory in a row form, or controls any sub-block in the second matrix to be stored into the second memory in a row form. In this way, the sub-block can be read quickly, and the sub-block is transposed flexibly and quickly.

According to a second aspect, this application provides an electronic device, where the electronic device may include:

a secure element provided in any implementation of the first aspect and a discrete device coupled to a chip.

According to a third aspect, this application provides a system on chip, where the system on chip includes a chip provided in any implementation of the first aspect. The system on chip may include a chip, or may include a chip and another discrete device.

BRIEF DESCRIPTION OF DRAWINGS

To describe the technical solutions in the embodiments of the present invention or in the background more clearly, the following briefly describes the accompanying drawings required for describing the embodiments of the present invention or the background.

FIG. 8 is a schematic diagram of dividing a matrix into blocks according to an embodiment of the present invention;

FIG. 13 is a schematic diagram of pipeline execution of a matrix multiplier at a moment T=1 when M=2, N=2, and K=2;

FIG. 14 is a schematic diagram of pipeline execution of a matrix multiplier at a moment T=7 when M=2, N=2, and K=2;

DESCRIPTION OF EMBODIMENTS

Figure 1:
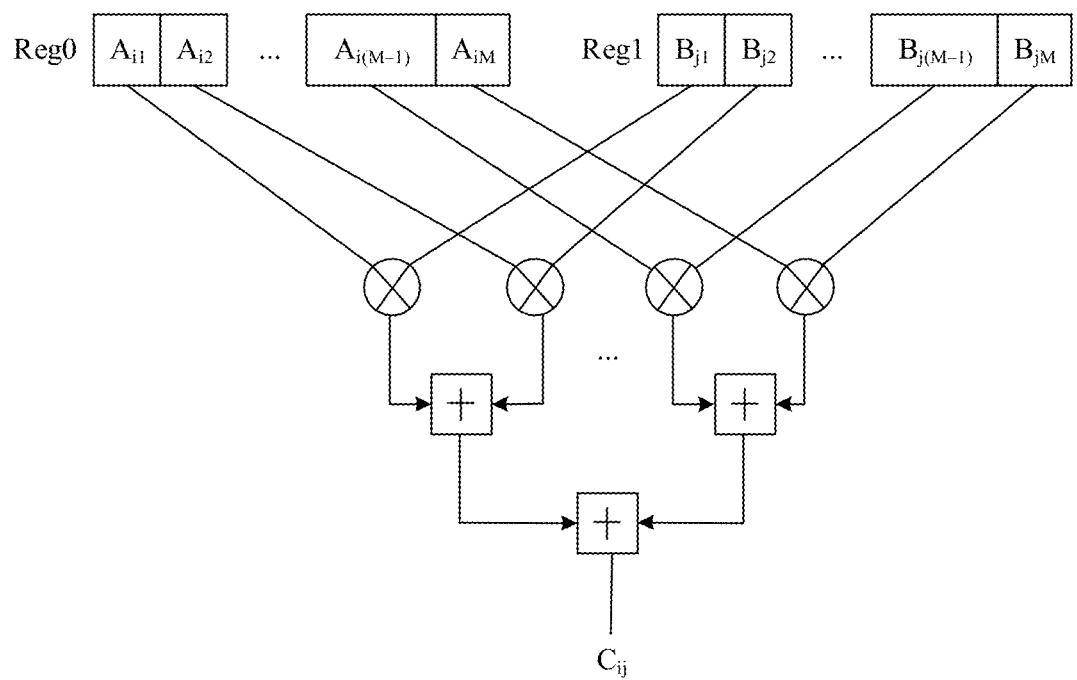
FIG. 1 is a schematic diagram of a process of computing a product of two matrices in the prior art.

The following describes the embodiments of the present invention with reference to the accompanying drawings in the embodiments of the present invention.

In this specification, claims, and accompanying drawings of this application, the terms "first", "second", "third", "fourth", and the like are intended to distinguish between different objects but do not indicate a particular order. In addition, the term "including", "having", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in this specification means that a particular characteristic, structure, or feature described with reference to the embodiment may be included in at least one embodiment of this application. The phrase shown in various locations in this specification may not necessarily refer to a same embodiment, and is not an independent or optional embodiment exclusive from another embodiment. It is explicitly and implicitly understood by a person skilled in the art that the embodiments described in this specification may be combined with another embodiment.

Terminologies such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in figures, both an application that runs on a computing device and the computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

Next, a technical problem that needs to be resolved and an application scenario in this application are provided. In recent years, with good performance of a convolutional neural network in image classification, image recognition, audio recognition, and other related fields, the convolutional neural network becomes a research and development hotspot in the academic and industrial circles. The convolutional neural network mainly includes a convolution operation and a fully-connected (fully-connected, FC) operation. An operation amount of the convolution operation can usually occupy more than 70% of an entire operation amount of the network.

Figure 2:
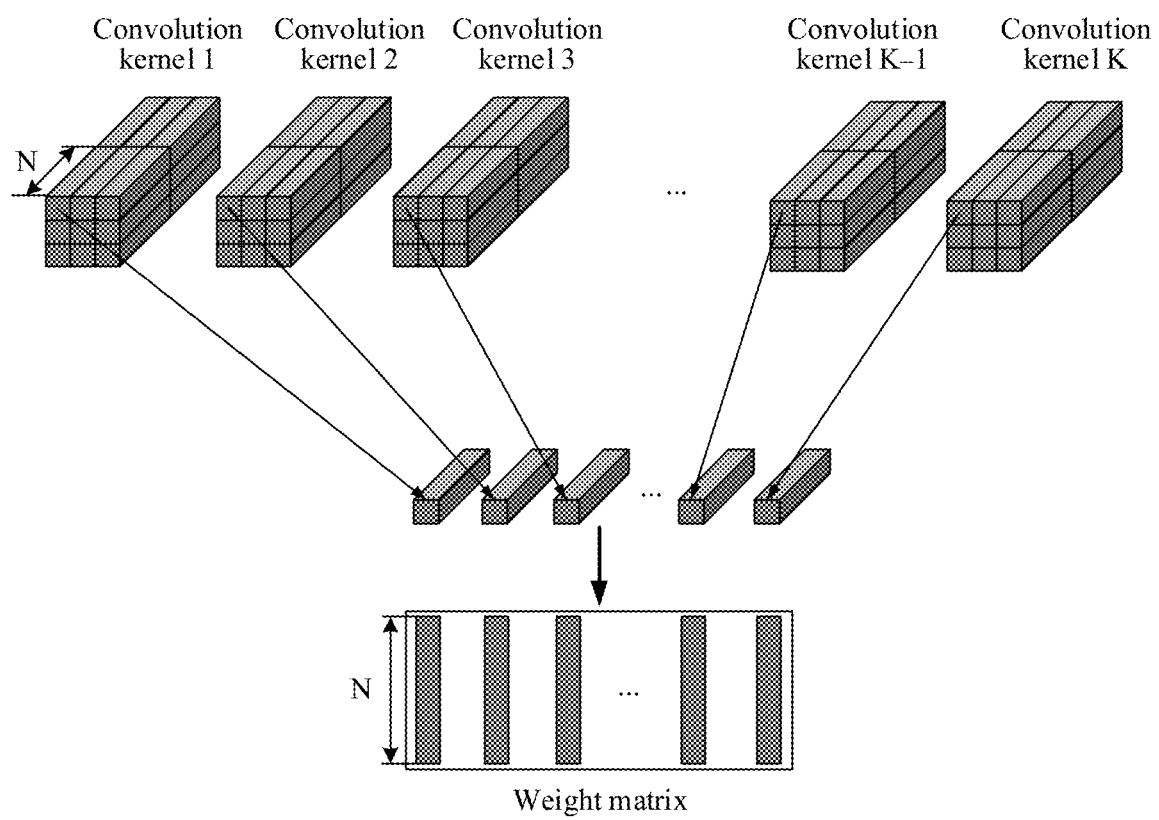
FIG. 2 is a schematic diagram of converting a convolution kernel into a weight matrix in the prior art.

The convolution operation is not strictly equivalent to a matrix multiplication operation. However, the convolution operation may be converted into the matrix multiplication operation through proper data adjustment. There are usually a plurality of convolution kernels in the convolutional neural network. The convolution kernel is three-dimensional and includes three dimensions of data. Directions x and y represent a length and a width of the data, and a direction z may be considered as a depth of the data. The convolution kernel is actually a filter (filter), and is mainly configured to extract different features from an image. Referring to FIG. 2, the convolution kernel is substantially a combination of a series of weights. It is assumed that there are K convolution kernels. N elements in a direction z at a same position in the K convolution kernels are extracted, so that an N*K weight matrix (weight matrix) can be obtained. The convolution kernels may be prestored in a memory of a matrix multiplier in a form of a weight matrix based on a specification (to be specific, a row quantity and a column quantity of a matrix that can be computed by the matrix multiplier) of the matrix multiplier, so that the convolution kernels are invoked when the matrix multiplier performs a matrix multiplication operation. In the embodiments of the present invention, "*" represents "multiplication".

Figures 3, 4:
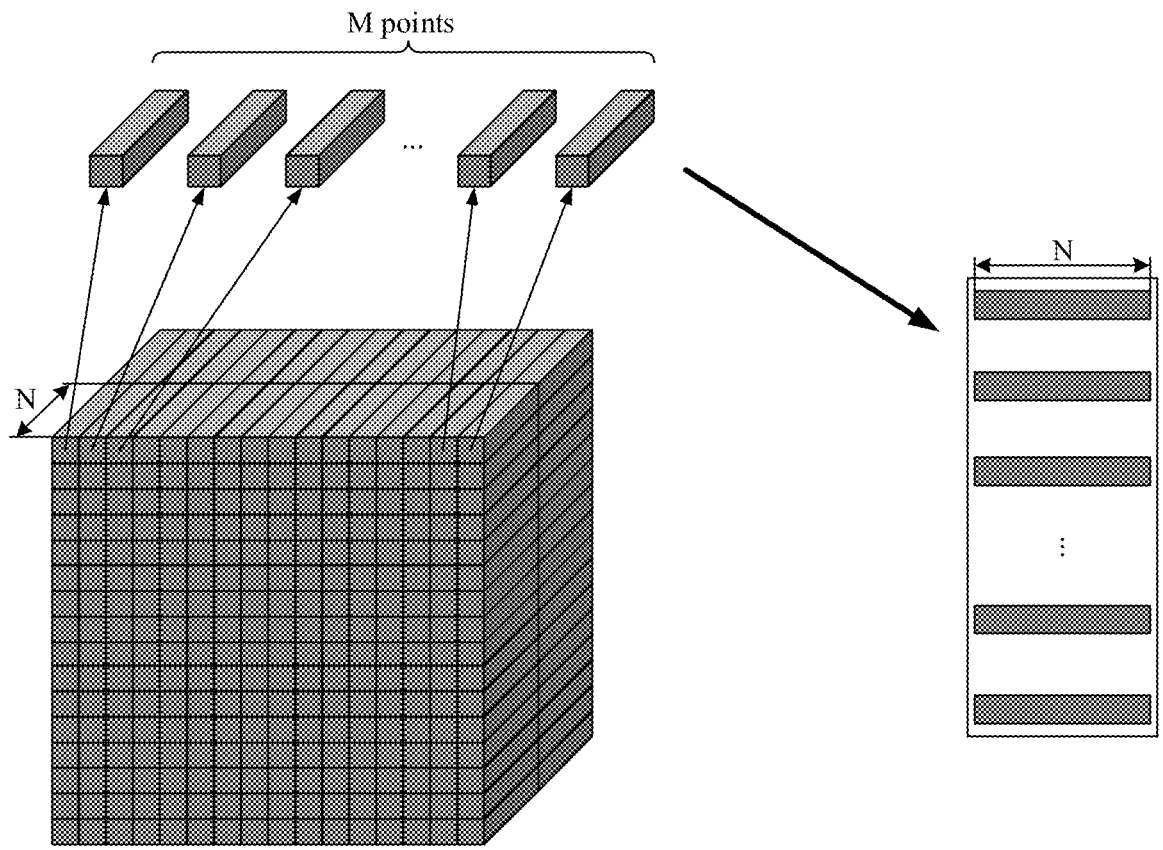
FIG. 3 is a schematic diagram of converting input data into an input matrix in the prior art.
FIG. 4 is a schematic diagram of a method for performing a multiplication operation on two matrices in the prior art.

Referring to FIG. 3, based on a stride (stride) (in this embodiment of the present invention, the stride is 1) of the convolution kernel, the matrix multiplier may extract N pieces of data of M input points in the direction z, that is, a total of M*N pieces of data. An input matrix (input matrix) may be formed. The matrix multiplier needs to perform a multiplication operation on the input matrix and the weight matrix.

The FC operation is substantially a multiplication operation of a vector and a matrix. An input of the FC operation is a vector 9216, and the FC operation needs to output 4096 points. In this case, to obtain a point that is output by the FC operation, a point multiplication operation needs to be performed on a vector 9126 and 9216 weights; and to obtain all 4096 points, a point multiplication operation needs to be performed on the vector 9216 and 9216×4096 weights.

FIG. 4 shows a computation formula of a matrix C=A*B, where A represents a matrix of an M*K size, and B represents a matrix of a K*N size. In this embodiment of the present invention, M, N, and K each are a positive integer. To obtain one piece of data in the matrix C through computation, a point multiplication operation needs to be performed on data in one row vector in the matrix A and corresponding data in one column vector in the matrix B, and then accumulation is performed. In other words, to obtain one piece of data in the matrix C through computation, N multiplication operations need to be performed. In this case, to obtain the matrix C through computation, M*N*K multiplication operations need to be performed.

Figure 5:
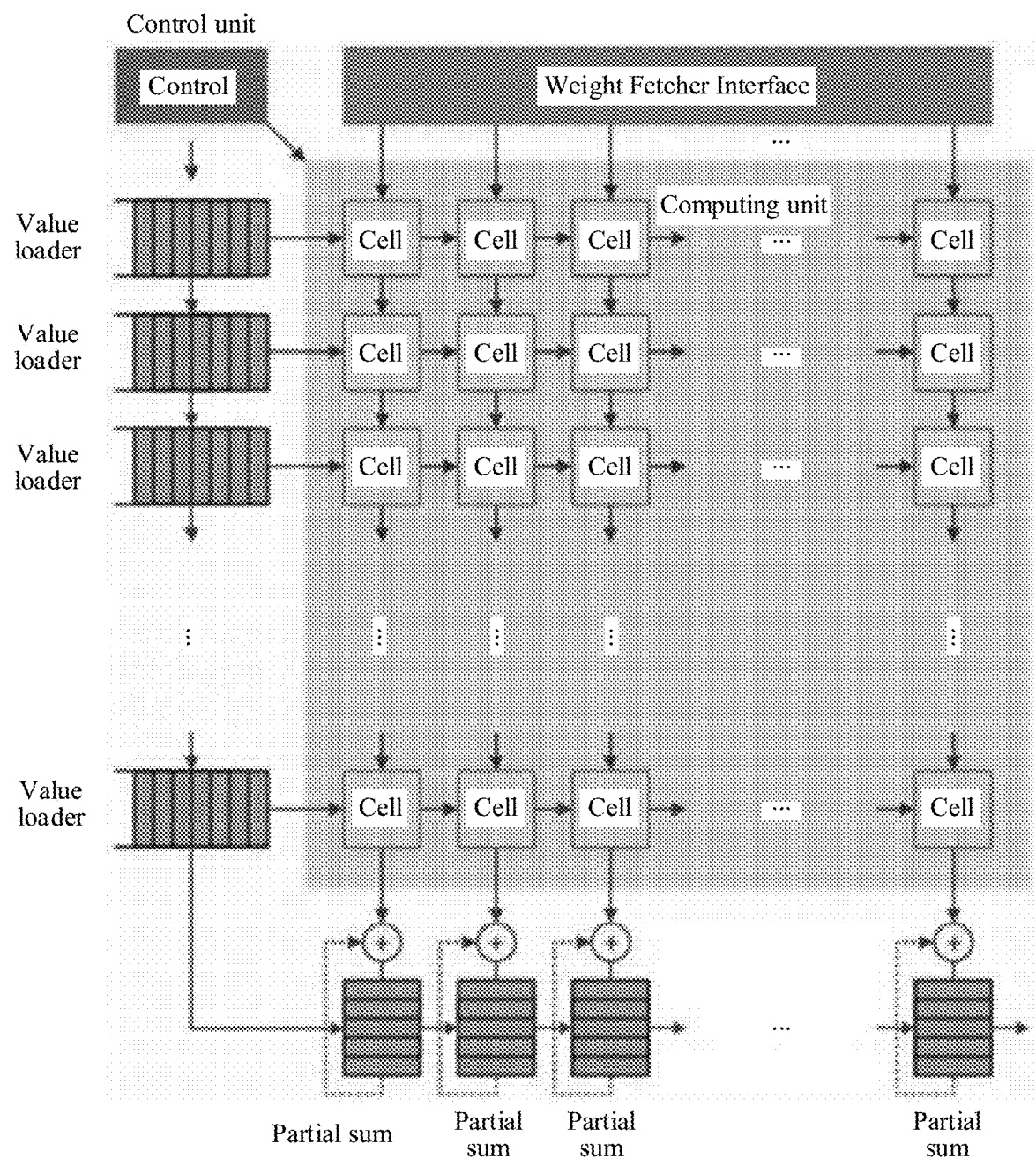
FIG. 5 is a schematic diagram of a TPU systolic array in the prior art.

In the prior art, a systolic array computing manner, for example, a dedicated chip (ASIC) Google TPUv1 customized by Google for machine learning uses a systolic array design to optimize a matrix multiplication and a convolution operation (as shown in FIG. 5) by using a 256×256 2-D MAC array. Each cell in the figure is one multiplier. After the multiplier multiplies elements in two matrices, a result (Partial Sum, that is, an intermediate result in matrix multiplication) obtained through computation is transmitted down to an accumulation unit in the lower part of the figure, and is accumulated with a previous related accumulated value. In this way, when data is run in a full load state, the systolic array accumulates an intermediate value of a size of one matrix in each clock cycle. In the foregoing solution, matrix multiplication computation efficiency is relatively low because of low computation density. In addition, during a convolution operation, because a computing size of the systolic array is relatively fixed, to increase operation efficiency of the systolic array, an input and a weight need to be transformed in many forms, resulting in an inflexible operation. Moreover, during matrix multiplication, data needs to have a large size to achieve a pipeline execution effect. For example, computation efficiency of a 256×256 2-D systolic array in a small matrix is not high.

In addition, a related patent implements an M*K*N 3-D MAC array. In comparison with the TPUv1 and NVDLA 2-D MAC array solutions, the matrix multiplication computation efficiency is significantly increased. The present invention provides a new hardware accelerator architecture, so that the new hardware accelerator architecture can complete an [N×N] matrix multiplication operation in a single clock cycle. In the hardware architecture, a quantity of included processing engines (PE) is N×N×N, and a quantity of included adder trees is N×N. In addition, a computation method for dividing a large matrix into smaller matrices is also provided. However, in the foregoing solution, a matrix size needs to be supplemented to become a size supported by hardware. This wastes data bandwidth and reduces computation efficiency. If a matrix is artificially divided into a large matrix and a small matrix, software programming is complex, and a relative software programming amount is also increased greatly. In addition, because an accelerator can only load elements in the matrix in a unidirectional cyclic manner, and software needs to independently divide the matrix, a computation mode is single and inflexible. Moreover, once memories of the matrix A and the matrix B cannot accommodate all data, repeated reading occurs. Therefore, a buffer size is relatively strongly dependent on a service algorithm, to be specific, the accelerator is heavily dependent on a tightly coupled on-chip memory.

Therefore, a technical problem to be resolved in this application is how to perform a large quantity of data operations in a convolutional neural network by using hardware in an efficient, flexible, and low energy manner.

It can be understood that the matrix multiplier provided in this embodiment of the present invention may be applied to fields such as machine learning, deep learning, and a convolutional neural network, or may be applied to fields such as digital image processing and digital signal processing, or may be applied to other fields related to a matrix multiplication operation.

Figure 6:
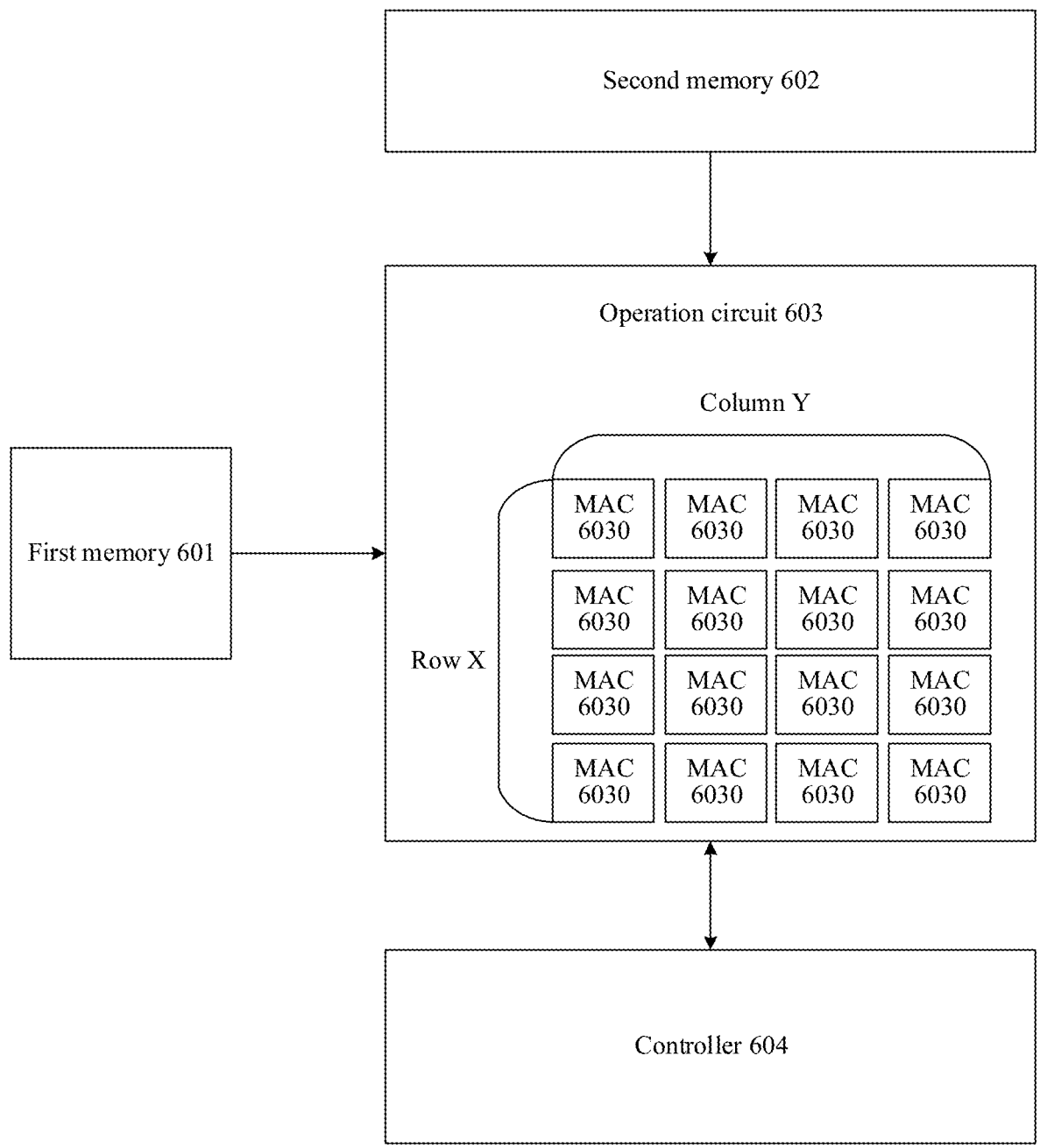
FIG. 6 is a structural diagram of a matrix multiplication accelerator according to an embodiment of the present invention.

Based on the foregoing analysis, this application provides a matrix multiplication accelerator, to specifically analyze and resolve the technical problem provided in this application. FIG. 6 is a structural diagram of a matrix multiplier 60 according to an embodiment of the present invention. As shown in FIG. 6, the matrix multiplier 60 includes a first memory 601, a second memory 602, an operation circuit 603, and a controller 604. The operation circuit 603 may perform data communication with the first memory 601, the second memory 602, and the controller 604 by using a bus. The operation circuit 603 is configured to: extract matrix data from the first memory 601 and the second memory 602, and perform a vector multiplication and addition operation. The controller 604 is configured to control, according to a preset program or instruction, the operation circuit 603 to complete a vector operation. The first memory 601 is configured to store a first matrix.

The first matrix is an M*K matrix. If a matrix a is the first matrix, an element in a row i and a column j in the first matrix a may be denoted as $a_{ij}$, where i=(1, 2, 3, . . . , and M), and j=(1, 2, 3, . . . , and K).

The first memory 601 mentioned in this embodiment of the present invention and the second memory 602, a third memory 605, and an internal memory of the related matrix multiplier that are mentioned below each may be a register, a random access memory (random access memory, RAM for short), a static random access memory, a flash memory, or another readable and writable memory. In this application, data types of the first matrix, a second matrix, and an operation result each may be a type such as int 8, fp16, or fp32.

The second memory 602 is configured to store the second matrix, where the second matrix is a K*N matrix. If a matrix b is the second matrix, an element in a row j and a column g in the second matrix b may be denoted as $B_{jg}$, where j=(1, 2, 3, . . . , and K), and g=(1, 2, 3, . . . , and N).

Herein, M, K, N, X, and Y each are an integer greater than 0. Any two parameters in M, N, and K may be equal or not equal. Alternatively, M, N, and K may be equal or not equal. X and Y may be equal or not equal. This is not specifically limited in this application.

The operation circuit 603 may include operation units 6030 (which may be referred to as multiplication-accumulation units MAC) of X rows and Y columns. Each operation unit may independently perform a vector multiplication operation. In FIG. 6, an example in which the operation circuit 603 includes 4*4 operation units 6030 is used for drawing, that is, X=4, and Y=4. The operation unit 6030 is provided with two inputs that are respectively used to receive a row vector sent by the first memory 601 and a column vector sent by the second memory 602, and perform a vector multiplication operation on the row vector and the column vector. Specifically, one operation circuit 6030 includes a vector multiplication circuit and an addition circuit, where the vector multiplication circuit is configured to receive row vector data sent by the first memory 601 and column vector data sent by the second memory 602, and multiply the two vectors; and the addition circuit is configured to add results obtained by multiplying the two vectors, and accumulate computation results of a same operation unit, to obtain an operation result of the operation unit 6030.

Figure 7:
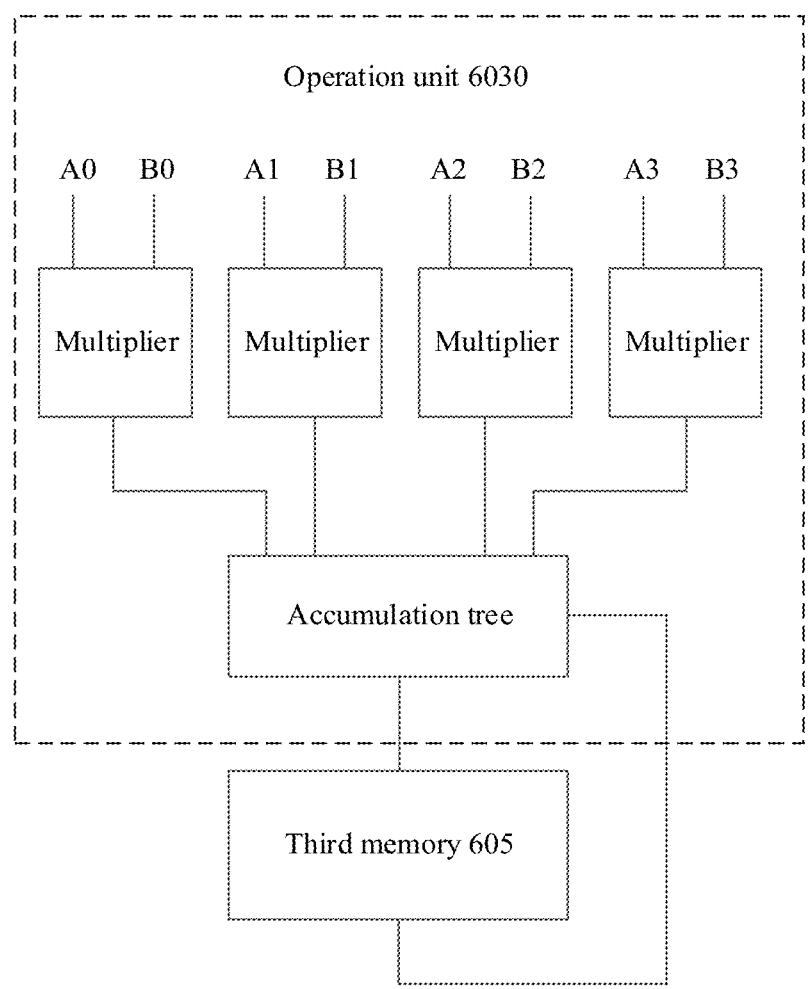
FIG. 7 is a structural diagram of an operation unit 6030 according to an embodiment of the present invention.

FIG. 7 is a structural diagram of an operation unit 6030. In a possible implementation, the vector multiplication circuit includes L (for example, L=4) multipliers. The addition circuit includes an adder tree with an input quantity being L+1, to be specific, the adder tree is configured to accumulate L multiplication results and accumulate computation results of the operation unit in different clock cycles. Optionally, the matrix multiplier 60 further includes a third memory 605, and the third memory 605 is configured to store operation results of the vector multiplication circuit and the addition circuit, and store operation results in different clock cycles. It can be understood that the third memory 605 in this application may include X*Y storage units, and each storage unit is configured to store an operation result obtained each time a corresponding operation unit performs an operation. Alternatively, each operation unit corresponds to a specified storage space in the third memory

605, and the storage space is used to store an operation result obtained each time the operation unit performs an operation.

The controller 604 may perform the following action to compute a product of the first matrix and the second matrix:

The controller 604 divides the first matrix into blocks in a unit of a sub-block whose size is X*L, to obtain S×R sub-blocks of a same size, where a sub-block in a row s and a column r of the S×R sub-blocks is denoted as $A_{sr}$, s=(1, 2, 3, . . . , and S), and r=(1, 2, 3, . . . , and R). That is, for the matrix multiplier 60 in this application, matrix data of X rows and Y columns included in the matrix multiplier 60 is fixed after production or delivery, and a quantity L of multipliers in a corresponding multiplication circuit is also fixed. Therefore, during a matrix operation, the first matrix and the second matrix need to be fractal, that is, need to be divided into blocks. A division manner is to divide the first matrix into blocks by using an X*L sub-block as a unit. In this embodiment of the present invention, an objective of block division is to divide a large matrix into many small matrices conforming to a size of a matrix multiplier, and then compute the small matrices in a specific sequence and accumulate values of the related small matrices, to finally obtain a matrix multiplication result. In this way, flexible computation can be performed, to facilitate subsequent reusing and multi-level caching, computation efficiency can be further increased, and data moving bandwidth and energy consumption can be reduced.

It should be noted that the first matrix is an M*K matrix, and a case in which the first matrix cannot be exactly divided by an integer quantity of X*L sub-blocks may exist. Therefore, when M/X or K/L is not an integer, an operation may be performed in a manner of padding an element 0. Alternatively, no computation is performed at a corresponding location, and a value of a result is assigned 0. Specifically, $$S = \begin{cases} M/X, & M\%X = 0 \\ \left[\frac{M}{X}\right]+1, & M\%X \neq 0 \end{cases}, \text{ and } R = \begin{cases} K/L, & K\%L = 0 \\ \left[\frac{K}{L}\right]+1, & K\%L \neq 0 \end{cases};$$

when M % X≠0, computation is not performed on a row (M+1) to a row (S*X−M) of the first matrix, and a value of a result is assigned 0; and when K % Y≠0, computation is not performed on a column (K+1) to a column (R*Y−K) of the first matrix, and a value of a result is assigned 0. In other words, an operation unit does not perform substantive multiplication computation on a corresponding row and column, but considers that an operation has been performed but a result is 0 for processing. In this way, read and operation power consumption of the corresponding operation unit can be reduced.

Correspondingly, the controller 604 divides the second matrix into blocks in a unit of a sub-block whose size is L*Y, to obtain R×T sub-blocks of a same size, where a sub-block in a row r and a column tin the R×T sub-blocks is denoted as $B_{rt}$, r=(1, 2, 3, . . . , and R), and t=(1, 2, 3, . . . , and T). After the controller 604 controls the first matrix to be divided into blocks according to a specification of the operation circuit 603, the second matrix also needs to be correspondingly divided in a manner of matching the first matrix; otherwise, matrix multiplication computation cannot be performed.

It should be noted that the second matrix is a K*N matrix, and a case in which the second matrix cannot be exactly divided by an integer quantity of L*Y sub-blocks may exist. Therefore, when K/L or N/Y is not an integer, an operation may be performed in a manner of padding an element 0. Alternatively, no computation is performed at a corresponding location, and a value of a result is assigned 0. Specifically, $$R = \begin{cases} K/L, & K\%L = 0 \\ \left[\frac{K}{L}\right]+1, & K\%L \neq 0 \end{cases}, \text{ and } T = \begin{cases} N/Y, & N\%Y = 0 \\ \left[\frac{N}{Y}\right]+1, & N\%Y \neq 0 \end{cases};$$

when K % Y≠0, computation is not performed on a column (K+1) to a column (R*Y−K) of the first matrix, and a value of a result is assigned 0; and when N % X≠0, computation is not performed on a row (N+1) to a row (T*X−N) of the first matrix, and a value of a result is assigned 0. In other words, an operation unit does not perform substantive multiplication computation on a corresponding row and column, but considers that an operation has been performed but a result is 0 for processing. In this way, read and operation power consumption of the corresponding operation unit can be reduced.

After the first matrix and the second matrix are separately divided into blocks according to fixed specifications, the two matrices may be input into the operation circuit 603 to perform a matrix multiplication operation between sub-blocks. In a specific computation process, the controller 604 may control a row x in X row vectors of any sub-block $A_{sr}$ and a column y in Y column vectors of a corresponding sub-block $B_{rt}$ to be input into an operation unit in a row x and a column y in the operation units of X rows and Y columns, so as to perform an operation, where x=(1, 2, 3, . . . , and X), y=(1, 2, 3, . . . , and Y), and r in the any sub-block $A_{sr}$ and r in the corresponding sub-block $B_{rt}$ have an equal value. Before a row vector of the sub-block $A_{sr}$ and a column vector of the sub-block $B_{rt}$ are input into the operation unit, the first matrix and the second matrix have been divided into blocks, that is, fractals. Therefore, there may be a plurality of implementations for inputting the sub-block $A_{sr}$ and the corresponding sub-block $B_{rt}$ into the operation circuit 603 in a specific sequence.

Figure 8:
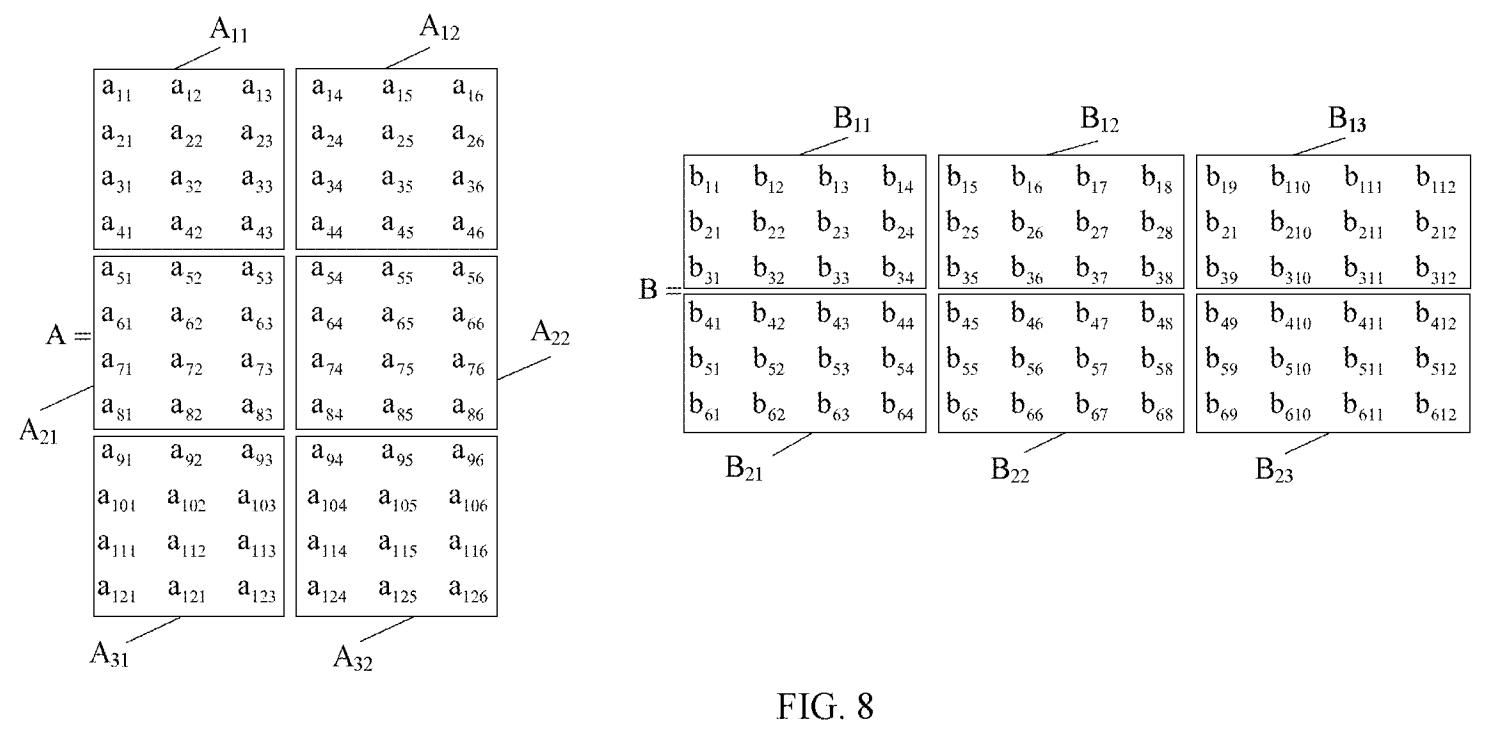

In a possible implementation, operations may be performed successively in a sequence of values of s or tin the sub-block $A_{sr}$ and the corresponding sub-block $B_{rt}$. As shown in FIG. 8, for example, the first matrix is an M*K matrix, and the second matrix is a K*N matrix. It is assumed that M=12, K=6, N=12, X=4, Y=4, and L=3. After the first matrix and the second matrix are divided into blocks, it is learned that S=3, R=2, and T=3. In this case, a first matrix $$A = \begin{bmatrix} A_{11} & A_{12} \\ A_{21} & A_{22} \\ A_{31} & A_{33} \end{bmatrix}$$

and a second matrix $$B = \begin{bmatrix} B_{11} & B_{12} & B_{13} \\ B_{21} & B_{22} & B_{23} \end{bmatrix}$$

are obtained after block division, where A represents an X*L matrix, that is, a 4*3 matrix, and each element in B is actually an L*Y matrix, that is, a 3*4 matrix.

$$C = A*B = \begin{bmatrix} A_{11}B_{11} + A_{12}B_{21} & A_{11}B_{12} + A_{12}B_{22} & A_{11}B_{13} + A_{12}B_{23} \\ A_{21}B_{11} + A_{22}B_{21} & A_{21}B_{12} + A_{22}B_{22} & A_{21}B_{13} + A_{22}B_{23} \\ A_{31}B_{11} + A_{32}B_{21} & A_{31}B_{12} + A_{32}B_{22} & A_{31}B_{13} + A_{32}B_{23} \end{bmatrix}$$

In a multiplication operation of the first matrix and the second matrix, a matrix multiplication operation needs to be performed on any one sub-block $A_{sr}$, that is, each sub-block $A_{sr}$ in the first matrix, and a corresponding sub-block $B_{rt}$ in the second matrix. There may be a plurality of implementations for determining a specific sequence and a specific sub-block on which matrix multiplication computation is first performed in the sequence.

Manner 1: In a matrix multiplication sequence, for example, sub-blocks may be a sub-block $A_{11}$ and a sub-block $B_{11}$. All row vectors of $A_{11}$ and all column vectors of the corresponding $B_{11}$ are input in a first sub-block multiplication computation cycle (which may be understood as a first round), so as to perform an operation. An operation is performed on all row vectors of $A_{12}$ and all column vectors in corresponding $B_{21}$ in a second sub-block multiplication computation cycle (which may be understood as a second round). In this way, after an operation unit performs accumulation, a value of a result point $C_{11}$ in a row 1 and a column 1 in the result matrix C may be obtained. By analogy, result points at all locations in the result matrix C may be obtained. Actually, $$C_{11} = A_{11}B_{11} + A_{12}B_{21}, \text{ where}$$

$$A_{11} = \begin{bmatrix} a_{11} & a_{12} & a_{13} \\ a_{21} & a_{22} & a_{23} \\ a_{31} & a_{32} & a_{33} \\ a_{41} & a_{42} & a_{43} \end{bmatrix}, A_{12} = \begin{bmatrix} a_{14} & a_{15} & a_{16} \\ a_{24} & a_{25} & a_{26} \\ a_{34} & a_{35} & a_{36} \\ a_{44} & a_{45} & a_{46} \end{bmatrix}$$

$$B_{11} = \begin{bmatrix} b_{11} & b_{12} & b_{13} \\ b_{21} & b_{22} & b_{23} \\ b_{31} & b_{32} & b_{33} \\ b_{41} & b_{42} & b_{43} \end{bmatrix}, B_{12} = \begin{bmatrix} b_{14} & b_{15} & b_{16} \\ b_{24} & b_{25} & b_{26} \\ b_{34} & b_{35} & b_{36} \\ b_{44} & b_{45} & b_{46} \end{bmatrix}$$

In other words, C11 is actually a 4*4 matrix. Therefore, according to a matrix computation rule, the finally obtained matrix C is an M*N result matrix, that is, a 12*12 result matrix.

Manner 2: One sub-block is reused according to a specific rule. This embodiment of the present invention provides a sub-block reusing manner to invoke one sub-block $A_{sr}$ in the first matrix and a corresponding sub-block $B_{rt}$ in the second matrix to perform a matrix multiplication operation on the sub-blocks. Specifically, the controller 604 is further configured to control values of s and r to remain unchanged and a value of t to be changed in at least two consecutive sub-block multiplication computation cycles, so that the first memory reuses a same sub-block $A_{sr}$ within the at least two consecutive sub-block multiplication computation cycles, where the sub-block multiplication computation cycle is a time used by the operation units of X rows and Y columns to complete a matrix multiplication operation on one sub-block $A_{sr}$ and a corresponding sub-block $B_{rt}$.

For example, in the foregoing embodiment in which it is assumed that M=12, K=6, N=12, X=4, Y=4, and L=3, all row vectors of $A_{11}$ and all column vectors of a corresponding sub-block $B_{11}$ are input in a first sub-block multiplication computation cycle (which may be understood as a first round), so as to perform an operation. In a second sub-block multiplication computation cycle (which may be understood as a second round), the values of s and r remain unchanged, but the value of t needs to be changed, to be specific, an operation is performed on all the row vectors of $A_{11}$ and all column vectors of another corresponding sub-block $B_{12}$. Optionally, in a third sub-block multiplication computation cycle (which may be understood as a third round), an operation is performed on all the row vectors of $A_{11}$ and all column vectors of still another corresponding sub-block $B_{13}$. In this way, $A_{11}$ in the first memory can be repeatedly used in several consecutive sub-block multiplication computation cycles, so that read and write overheads are reduced, and data moving bandwidth is reduced.

In Manner 1 and Manner 2, a computation rule for a sub-block $A_{sr}$ in the first matrix and a corresponding sub-block $B_{rt}$ in the second matrix in a sub-block multiplication computation cycle is that a row x in X row vectors of any sub-block $A_{sr}$ in the first matrix and a column y in Y column vectors of a corresponding sub-block $B_{rt}$ are input into an operation unit in a row x and a column y in the operation units of X rows and Y columns, so as to perform an operation, where x=(1, 2, 3, ... and X), y=(1, 2, 3, ..., and Y), and r in the any sub-block $A_{sr}$ and r in the corresponding sub-block $B_{rt}$ have an equal value. That is, any row vector of the sub-block $A_{sr}$ and any column vector of the corresponding sub-block $B_{rt}$ in the second matrix are input into a specified operation unit in the operation units of X rows and Y columns for computation. For example, a second row vector $[a_{21}\ a_{22}\ a_{23}]$ in $A_{11}$ and a third column vector $$\begin{bmatrix} b_{13} \\ b_{23} \\ b_{33} \end{bmatrix}$$

in a corresponding sub-block $B_{11}$ in the second matrix are input into an operation unit corresponding to a row 2 and a column 3 in the operation units of X rows and Y columns for operation, and so on.

Figure 9:
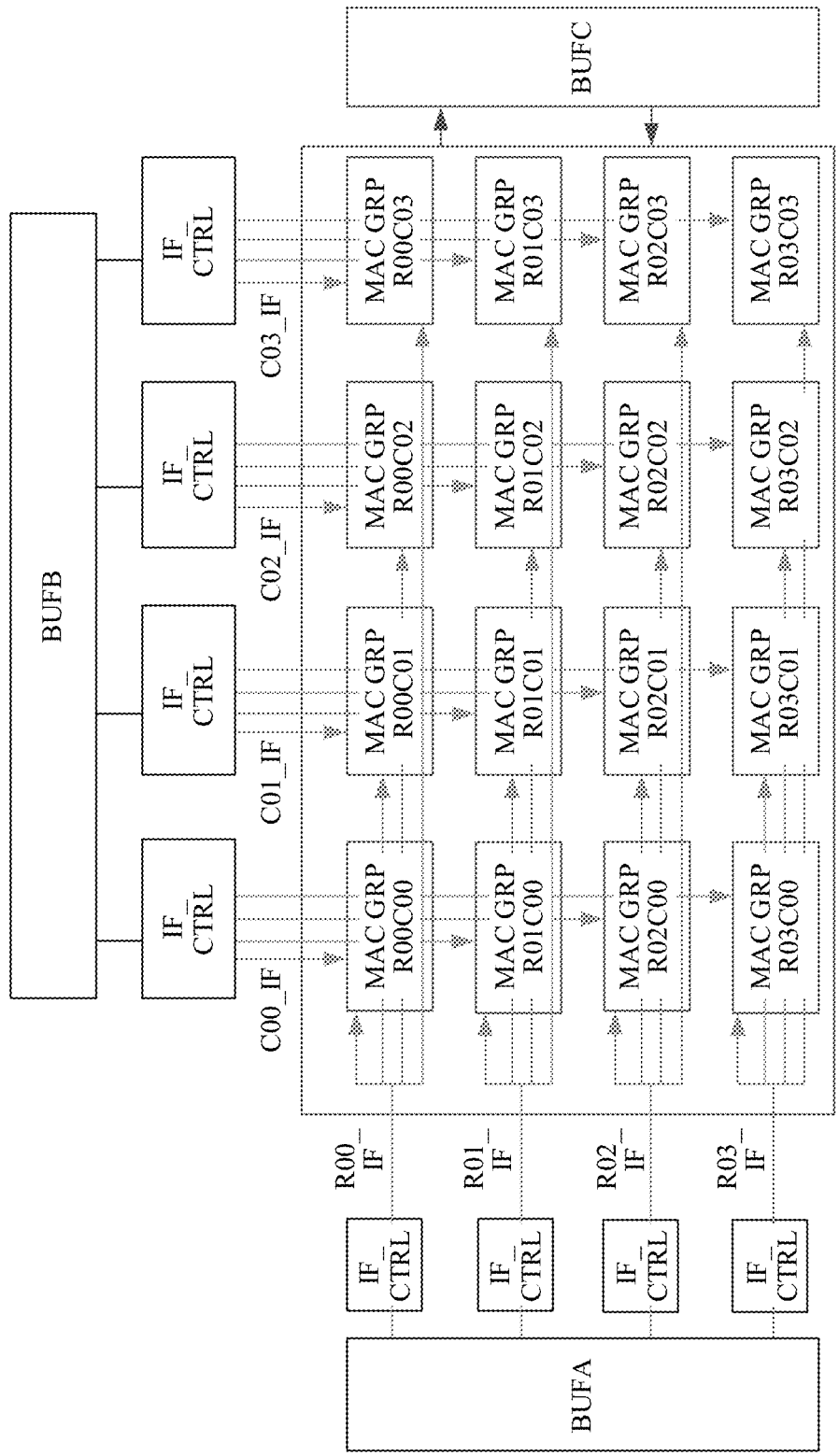
FIG. 9 is a schematic diagram of wiring in a specific operation circuit 603 according to an embodiment of the present invention.

According to an arrangement manner of the operation units in the operation circuit 603 shown in FIG. 6, FIG. 9 is a schematic diagram of wiring in a specific operation circuit 603 according to an embodiment of the present invention.

A BUFA is the first memory 601 of the first matrix, a BUFB is the second memory 602 of the second matrix, a BUFC is the third memory 605 that stores a computation result of each operation unit 6030, and the operation circuit 603 includes operation units of X rows and Y columns (assuming that X=4, and Y=4), that is, MAC GRP R00C00 to MAC GRP R03C03 in the figure. In addition, each operation unit MAC GRP may perform a multiplication operation on one row vector of an X*L matrix and one column vector of an L*Y matrix.

In this embodiment of the present invention, the operation circuit 603 may be referred to as a fractal matrix multiplication unit, includes a 3-D MAC array (MAC Cube) and an accumulator (Accumulator), and is configured to execute a fractal matrix multiplication instruction as follows: C=A*B or C=A*B+C, where A/B/C is a two-dimensional matrix. A size of A is (M*base)×(K*base), a size of B is (K*base)×(N*base), and a size of C is (M*base)×(N*base). Base is a basic size of the operation circuit 603, that is X*Y, for example, 8*8, 16*16, and 32*32. The foregoing C=A*B or C=A*B+C computation operation is referred to as MNK matrix multiplication (and accumulation). In an actual execution process, the controller controls a large matrix to be divided into basic matrices of a base size to complete MNK matrix multiplication in a fractal manner in a specific sequence combination (Manner 1 or Manner 2 mentioned above).

A specific architecture of the fractal matrix multiplication unit is shown in FIG. 7 (assuming that Base=4). For example, in FIG. 7, a MAC Group is an N*N (4*4) multiplication-accumulator group, and includes N (4) multiplication units and an accumulation tree with an input quantity being N+1 (5). In terms of matrix multiplication, a multiplication accumulator may perform an operation of multiplying one row by one column and performing accumulation (that is, one element in a result matrix). In FIG. 9, there are a total of 4×4 multiplication-accumulator groups, that is, a complete 4×4*433 4 matrix multiplication operation may be simultaneously computed.

It can be understood that, in the schematic diagram of wiring in FIG. 9, the operation circuit 603 may be supported in completing matrix multiplication computation on one sub-block $A_{sr}$ and a corresponding sub-block $B_{rt}$ in a same clock cycle. Because all of X row vectors of the sub-block $A_{sr}$ and all of Y column vectors of the corresponding sub-block $B_{rt}$ can reach a corresponding operation unit 6030 simultaneously from the corresponding BUFA and BUFB in the wiring manner in FIG. 9, the controller 604 may control the operation circuit 603 to complete multiplication computation on one sub-block $A_{sr}$ and a corresponding sub-block $B_{rt}$ in one clock cycle; and in a next clock cycle, complete multiplication computation on another sub-block $A_{sr}$ and a corresponding sub-block $B_{rt}$, or complete matrix multiplication computation on a same sub-block $A_{sr}$ and a corresponding another sub-block $B_{rt}$.

Figure 10:
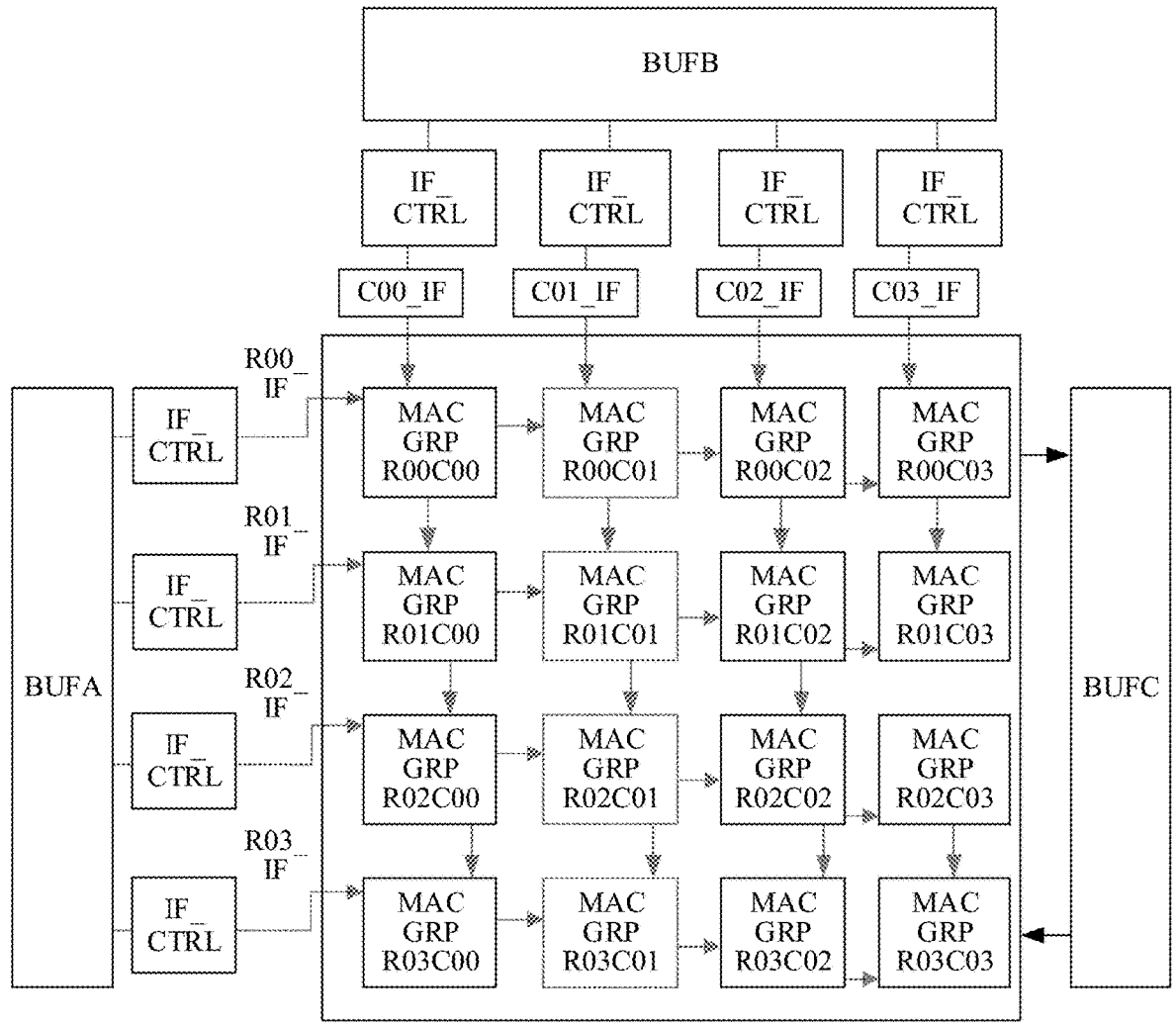
FIG. 10 is a schematic diagram of another wiring in a specific operation circuit 603 according to an embodiment of the present invention.

FIG. 10 is a schematic diagram of another wiring in a specific operation circuit 603 according to an embodiment of the present invention. In the operation circuit 603 corresponding to FIG. 10, a systolic array structure is provided. Specifically, the controller 604 is configured to control row vectors of the any sub-block $A_{sr}$ to successively enter, in ascending order of x row numbers, a row x corresponding to the operation units of X rows and Y columns, where a difference between moments at which adjacent row vectors enter operation units in a same column and different rows is one clock cycle; and the controller 604 is further configured to simultaneously control column vectors of the corresponding sub-block $B_{rt}$ to successively enter, in ascending order of y column numbers, a column y corresponding to the operation units of X rows and Y columns, where a difference between moments at which adjacent column vectors enter operation units in a same row and different columns is one clock cycle.

That is, to make full use of each operation unit 6030 (a multiplication accumulator), a fractal matrix multiplication unit in this embodiment of the present invention may have a systolic array structure. A difference from a TPUv1 structure lies in that a quantity of pieces of data in each systolic transmission is L (while a quantity of pieces of data in a TPUv1 is 1). Therefore, a degree of parallelism of data operations is greater than that of systolic arrays in the TPUv1.

Based on the systolic array architecture, in a wiring structure corresponding to FIG. 10, a BUFA/B is a memory configured to buffer a first matrix/a second matrix respectively. In FIG. 10, a first matrix buffer (BUFA) divides an identity matrix in the first matrix into X rows, and sequentially sends L elements in a same row to an operation unit in a systolic array in each clock cycle. Similarly, a second matrix buffer (BUFB) divides an identity matrix in the second matrix into Y columns, and sequentially sends L elements in a same column to the systolic array in each clock cycle. A specific time sequence is as follows.

A BUFC is a buffer (which may be constructed by using an L0 buffer or a buffer register) storing a "C" (offset) matrix in "A*B+C" computation, and an intermediate value in matrix multiplication may also be stored in the BUFC. After the multiplication accumulator completes multiplication, an accumulation tree accumulates L intermediate values obtained after the multiplication and one offset or intermediate value stored in the BUFC.

Figures 11, 12:
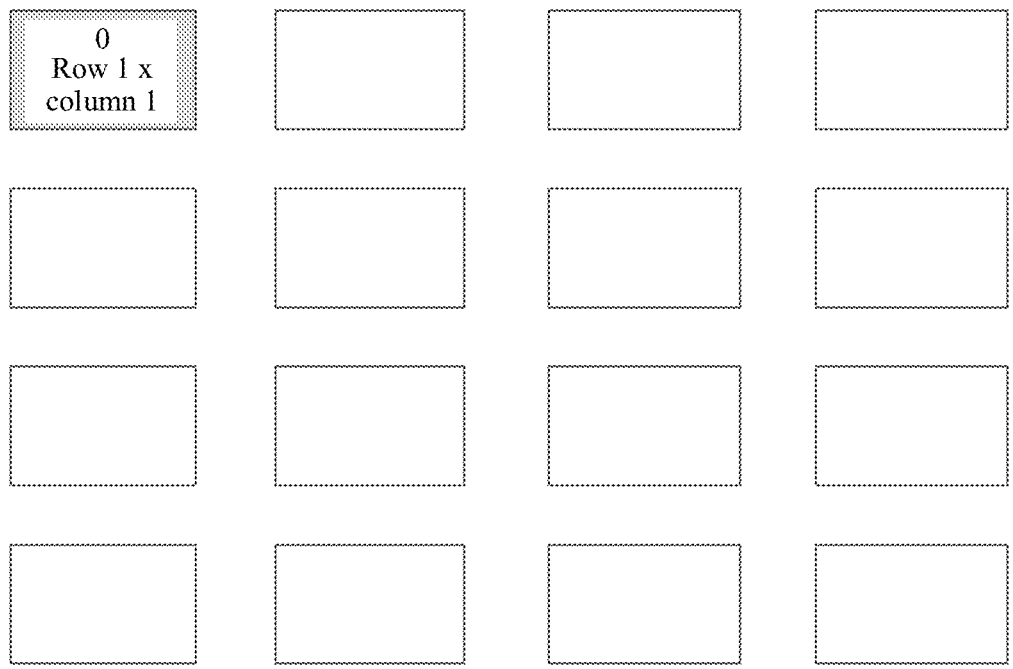
FIG. 11 shows an input format of a matrix multiplier whose base is 4 according to an embodiment of the present invention.
FIG. 12 is a schematic diagram of pipeline execution of a matrix multiplier at a moment T=0 when M=2, N=2, and K=2.
Figure 15:
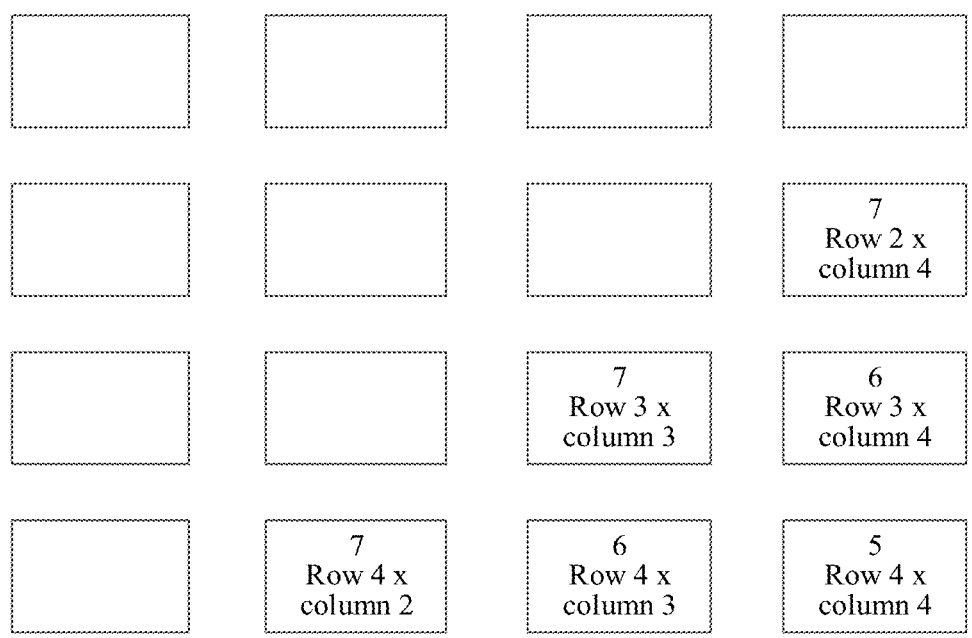
FIG. 15 is a schematic diagram of pipeline execution of a matrix multiplier at a moment T=11 when M=2, N=2, and K=2.

An example in which M=2, N=2, and K=2 (that is, 8×8*8×8 matrix multiplication) is used. The controller 604 in the matrix multiplier 60 divides matrix multiplication in a format in FIG. 11, to obtain eight 4×4 identity matrix operations in total. For an MNK matrix multiplication operation, there are many possibilities for a dividing sequence, and a rule of the dividing sequence is that the MNK matrix multiplication operation may be performed in the sequence in Manner 1 or Manner 2. It may be understood that, by using a policy of a maximum quantity of times of data reusing in Manner 2, power consumption for reading data can be reduced. After MNK fractal division is performed, the control logic of the controller 603 inputs eight fractals into the systolic array in eight clock cycles, as shown in FIG. 12 to FIG. 15. FIG. 12 shows pipeline execution of a fractal matrix multiplier at a moment T=0 when M=2, N=2, and K=2; FIG. 13 shows pipeline execution of a matrix multiplier at a moment T=1 when M=2, N=2, and K=2; FIG. 14 shows pipeline execution of a fractal matrix multiplier at a moment T=7 when M=2, N=2, and K=2; and FIG. 15 shows pipeline execution of a fractal matrix multiplier at a moment T=11 when M=2, N=2, and K=2. It can be learned that the systolic array starts to run in a full load state when T=6, that is, in the seventh clock cycle. In the last six clock cycles, an identity matrix is output from the systolic array, and a multiplication operation on the entire matrix is also completed.

Figure 16:
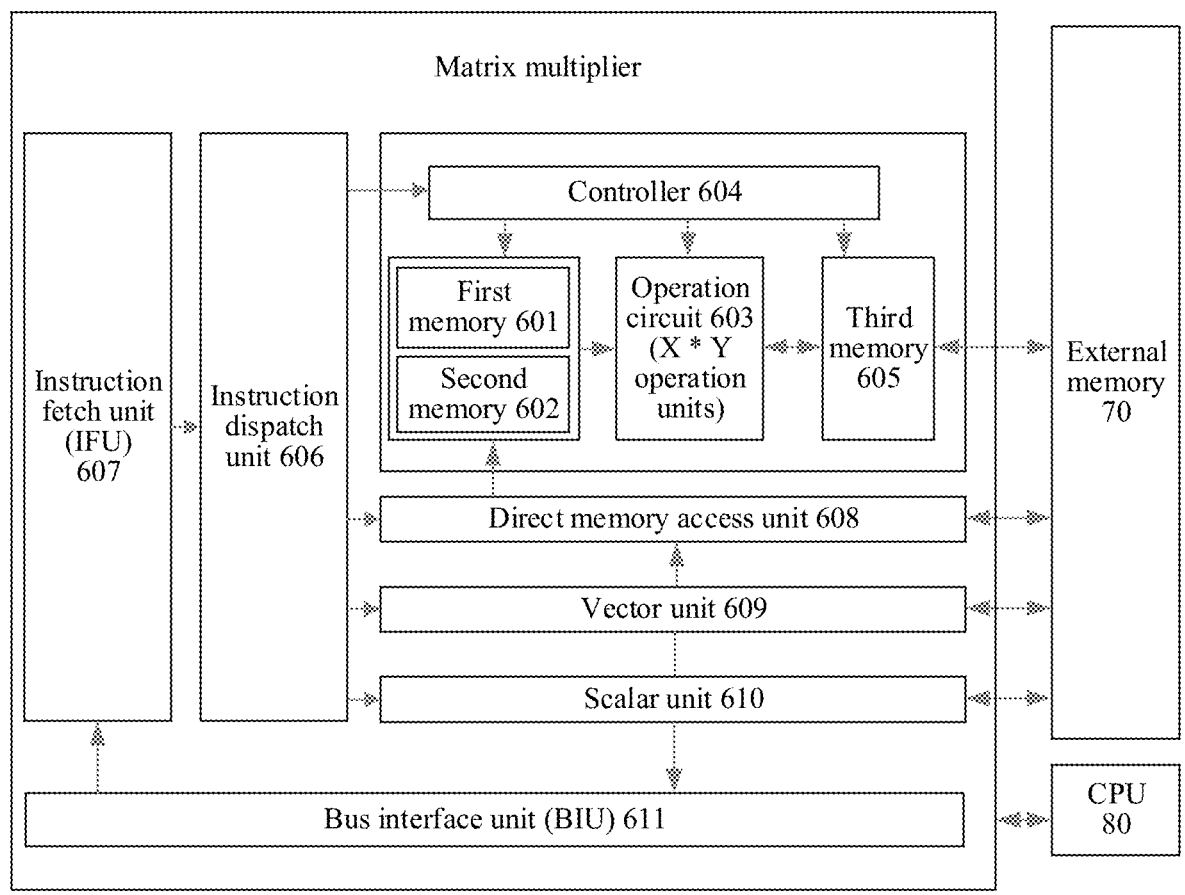
FIG. 16 is a structural diagram of another matrix multiplier according to an embodiment of the present invention.

Optionally, referring to FIG. 16, a matrix multiplier 60 may further include an instruction dispatch unit 606, an instruction fetch unit 607, a direct memory access unit 608, a vector unit 609, a scalar unit 610, and a bus interface unit 611. Further, the matrix multiplier 60 provided in this embodiment of the present invention may be used as a coprocessor and mounted on a central processing unit (Central Processing Unit, CPU for short) 80, and the CPU assigns a computation task to the matrix multiplier 60. Specifically, the CPU 80 may store a first matrix, a second matrix, and a related instruction into an external memory 70. The matrix multiplier 60 may complete a matrix multiplication operation by reading the first matrix, the second matrix, and the related instruction in the external memory 70. The external memory 70 may be specifically a double data rate synchronous dynamic random access memory (Double Data Rate Synchronous Dynamic Random Access Memory, DDR for short) or another readable and writable memory. The external memory may be a memory private to the matrix multiplier 60. Specifically, a first memory 601, a second memory 602, a third memory 605, and the external memory 70 are generally on-chip memories (On-Chip Buffer).

1. The vector unit 609 (Vector Unit) includes various types of multi-parallel computing devices (for example, floating-point multiplication, floating-point addition, and floating-point value comparison), where the computing device is configured to execute a SIMD (Single Instruction multiple data) instruction, and is responsible for direct data moving for a unified buffer (Unified Buffer) and an LOC buffer.

2. The scalar unit 610 (Scalar Unit) includes various types of integer basic operation devices (for example, addition, multiplication, comparison, and shift).

3. The direct memory access unit (Direct Memory Access Unit, DMA Unit) is configured to migrate data in each storage unit, for example, migrate data from an L1 RAM to an L0 RAM. When the direct memory access unit in this embodiment of the present invention migrates, from the external memory or the internal memory of the matrix multiplier, matrix data that participates in a multiplication operation, the direct memory access unit needs to store a result obtained after a matrix is divided into blocks. For example, for a 2*2 matrix, a sub-block $$A_{11} = \begin{bmatrix} A0 & A1 \\ A2 & A3 \end{bmatrix}$$

in a row 1 and a column 1 in a first matrix is stored in a unit of sub-block, and A0, A1, A2, and A3 are stored in one row, and so on. In this way, when the first matrix may be moved to the corresponding first memory or the second matrix may be moved to the corresponding second memory, storage may be performed in the foregoing manner. When the operation unit needs to perform reading, the operation unit may also perform reading in the foregoing storage sequence, so as to facilitate computation. When a row vector needs to be transposed into a column vector, transposing may be flexibly and quickly performed.

4. The instruction fetch unit 607 (Instruction Fetch Unit, IFU) is internally integrated with a PC (program counter) and an IM (instruction memory), fetches an instruction from a main memory by using the bus interface unit (BIU) 611, and decodes and controls an execution procedure.

5. The instruction dispatch unit 606 (Dispatch Unit) parses an instruction transmitted by the instruction fetch unit, and submits a type instruction corresponding to the instruction to four pipeline units, where the pipeline units are the scalar unit (Scalar Unit), the direct memory access (Direct Memory Access, DMA) unit, the vector unit (Vector Unit), and a fractal matrix multiplication unit in FIG. 16. There is a mechanism for the instruction dispatch unit to control in-order execution between the four pipelines.

It should be noted that the pipeline units have two types: asynchronous execution (Posted Execution) and synchronous execution. All type instructions are transmitted in an order-preserving manner. A difference lies in that execution of instructions by an asynchronous execution unit ends asynchronously and execution of instructions by a synchronous execution unit ends synchronously. The scalar unit (Scalar Unit) is a synchronous execution unit, and the fractal matrix multiplication unit (Fractal Mat Mult Unit), the DMA unit, and the vector unit (Vector Unit) are asynchronous execution units.

In a possible implementation, for the direct memory access unit, this embodiment of the present invention provides a configurable on-flight matrix transpose function. For example, when a block matrix of the first matrix is moved from a memory (for example, the external memory of the matrix multiplier) to another memory (the internal memory, such as the first memory, of the matrix multiplier), the direct memory access unit performs a matrix transpose operation during the moving, and stores transposed matrices in an order of the transposed matrices. Matrix transpose is a necessary operation phase of a neural network training process. In comparison with a common instruction for performing transpose after moving, a moving instruction for configurable on-flight matrix transpose in this embodiment of the present invention is more flexible, and software is also made easier and more concise. Details are shown in the following table.

Common instruction: Instruction for the configurable on-flight matrix transpose function:

| LOAD_L0 | X2, {X1} | LOAD_L0_to_L1.Trans {X4},{X1} |
| Transpose | X3, X2 | |
| STORE_L1 | {X4}, X3 | |

The common moving instruction is compared with the instruction for the configurable on-flight matrix transpose function. By supporting the configurable on-flight matrix transpose function, a same instruction can support more application scenarios with different parameters. A configurable on-flight matrix transpose method applicable to a fractal matrix multiplication processor architecture is designed.

Figure 17:
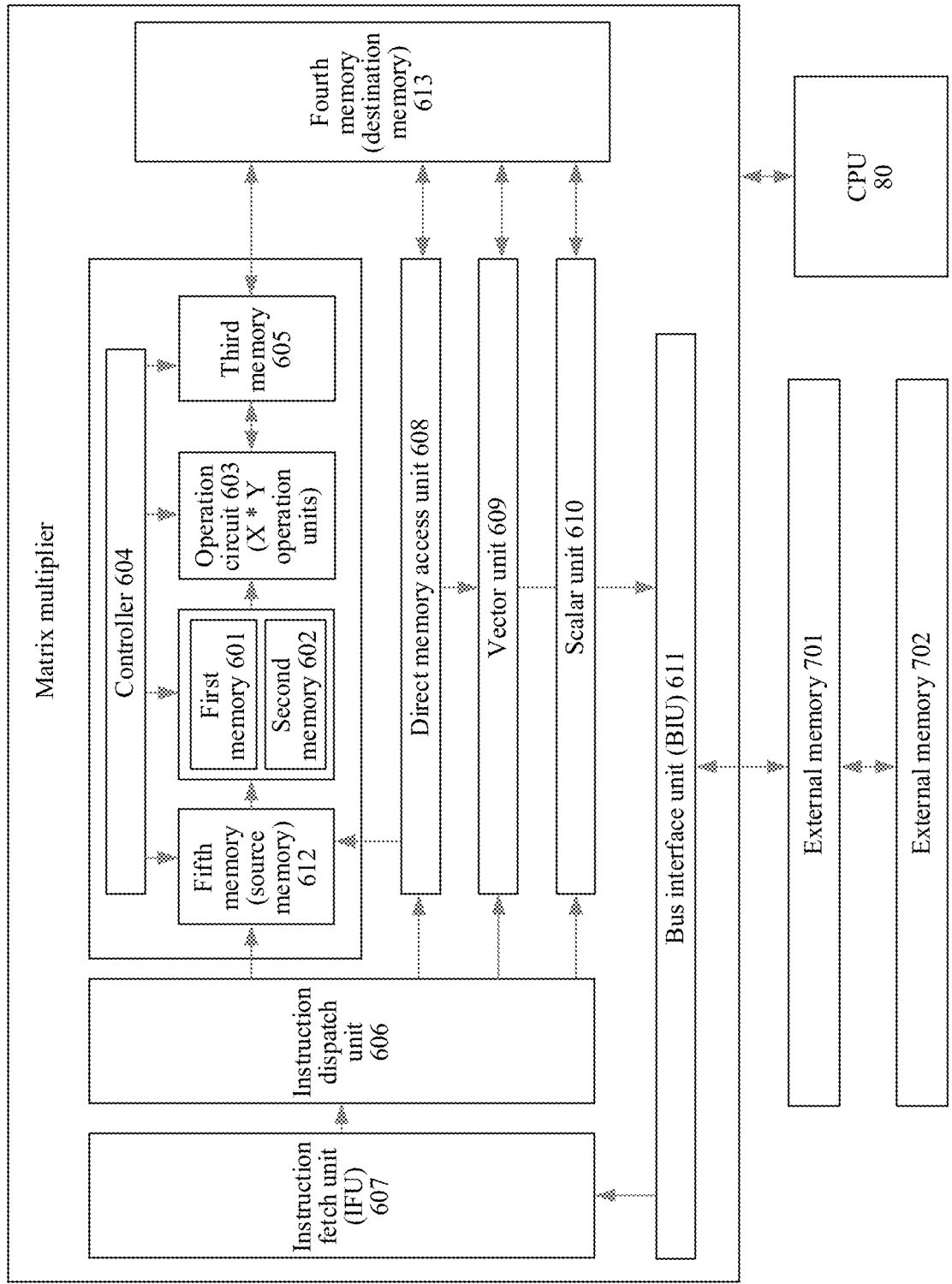
FIG. 17 is a structural diagram of still another matrix multiplier according to an embodiment of the present invention.

Referring to FIG. 17, to facilitate data reuse, reduce power consumption, and reduce dependence on a tightly coupled on-chip memory, an embodiment of the present invention further provides a storage structure using a multi-level buffer. All operation units may read/write interaction data by using a unified buffer (Unified Buffer). There are two levels of dedicated buffers L1 and L0 inside a matrix multiplier. The L1 buffer and the unified buffer usually exchange data with an external storage space by using a direct memory access DMA unit. The external storage space includes a plurality of levels of storage units. For example, the matrix multiplier includes a plurality of levels of buffers, and from L0 to L1, and then to an L2 buffer, a capacity increases progressively, access bandwidth decreases progressively, a delay increases progressively, and power consumption overheads increase progressively. L0 is an innermost-level buffer, and may be configured to buffer three matrices: a "first matrix", a "second matrix", and a "result matrix" in an MNK multiplication instruction. Because L0 is close to computation, a requirement on bandwidth and a delay is the highest, and a possibility of data reuse is the largest. A D trigger (DFF) may be used for constructing L0, to improve performance and reduce power consumption. Source and destination operands of a fractal instruction come from L1 (a fifth memory 612 and a fourth memory 613 in FIG. 17). Data is reused by using L0 (for example, a first memory 601 and a second memory 602 in FIG. 17) during execution. Software above the fractal instruction may reuse the data by using L1. Data reuse in the multi-level buffer may be implemented by using a sequence of executing the fractal instruction and a sequence of controlling the software above the fractal instruction. In addition, by reusing data in the multi-level buffer, a data moving time of the data in each buffer may also be hidden.

An example of the following table may describe data reuse and moving between multiple levels of buffers.

It is assumed that there are the following two matrices:

$$A = \begin{bmatrix} A0 & A1 \\ A2 & A3 \end{bmatrix}, \text{ and } B = \begin{bmatrix} A0 & A1 \\ A2 & A3 \end{bmatrix},$$

and data moving steps of the two matrices are shown in the following table.

| Moment | Reading from L1 | Storing into L0 | Computation |
|---|---|---|---|
| 1 | A0, B0 | | |
| 2 | B1 | A0, B0 | A0 * B0 |
| 3 | A2 | A0, B0, B1 | A0 * B1 |
| 4 | A1 | A0, A2, B0, B1 | A2 * B0 |
| 5 | B2 | A1, A2, B0, B1 | A2 * B1 |
| 6 | B3 | A1, A2, B1, B2 | A1 * B2 |
| 7 | A3 | A1, A2, B2, B3 | A1 * B3 |
| 8 | | A2, A3, B2, B3 | A3 * B2 |
| 9 | | A2, A3, B2, B3 | A3 * B3 |

At a moment 1, a controller 604 reads A0 and B0 parts of a matrix from the L1 buffer and stores the A0 and B0 parts into L0.

At a moment 2, A0 and B0 fractal matrices can be read from L0 and participate in an operation. At the same time, hardware reads a B1 fractal from L1 and stores the B1 fractal into L0, to make a preparation for a next operation. In addition, a data reading time is also hidden by computation. In this case, the hardware does not need to read both two fractal matrices, but reads only a B1 matrix. When "A0*B1" is computed for a matrix at a moment 3, data A0 stored at the moment 1 is reused. Referring to the foregoing list, it can be learned that in subsequent computation, data is reused in each time unit.

It should be noted that this embodiment of the present invention is not limited to data moving between L1 and L0. During data moving from L2 (for example, an external memory 701 and an external memory 702) to the L1 buffer, data may also be reused to reduce bandwidth and optimize energy consumption. In this embodiment of the present invention, a matrix dividing manner and a moving sequence are not limited. Data reuse should be maximized during data moving, to achieve that in each time unit, fractal matrix computation is performed in a full load state.

In this embodiment of the present invention, by using a multi-level buffer structure, matrix fractal data reuse, a sequence of executing a fractal instruction, and a sequence of controlling software above the fractal instruction, data reuse in a multi-level buffer can be achieved, dependence on a tightly coupled on-chip memory is reduced, energy efficiency is optimized, and software programming complexity is reduced.

In this embodiment of the present invention, a sequence of executing instructions for performing a multiplication operation on a matrix includes two manners: instruction synchronous execution and instruction asynchronous execution.

In this embodiment of the present invention, a series of control preparations and data preparations are required before a fractal matrix multiplication instruction is executed, for example, computation of a matrix size, reading of matrix data, and computation of a destination address. If an instruction execution policy of a processor is synchronous execution, to be specific, all instructions need to be committed (commit) in sequence, it is very possible that execution of the instructions does not start until an unassociated instruction ends. This may cause large and unnecessary performance losses. The following procedure is an instruction synchronous execution sequence:

address computation→control preparation→reading of a matrix 0→multiplication for the matrix 0→address computation→control preparation→reading of a matrix 1→multiplication for the matrix 1

Figure 18:
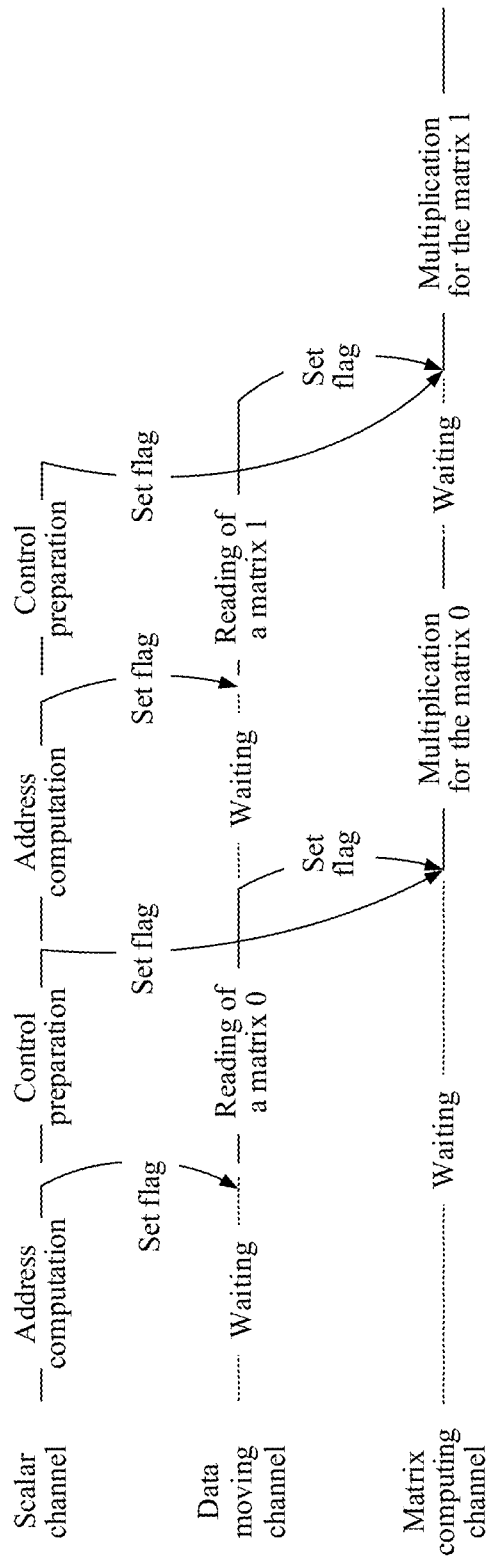
FIG. 18 is a schematic diagram of an instruction asynchronous execution sequence according to an embodiment of the present invention.

In the foregoing execution sequence, the control preparation, address computation, and data reading for the matrix 1 in a second time do not depend on ending of the multiplication for the matrix 0, and such an extra time may cause an unnecessary waiting time. To resolve this problem, in this embodiment of the present invention, a hardware instruction dispatch unit 606 performs transmission in a multi-channel order-preserving manner, so as to ensure that instructions of different types can be executed simultaneously and sequentially. In the foregoing example, control preparation and address computation are performed on a scalar channel in an order-preserving manner, matrix reading and storage are performed on a data moving channel in an order-preserving manner, and matrix multiplication computation is also performed on a matrix operation channel in an order-preserving manner. The channels may overlap but not be order-preserved, and mutually dependent instructions may be synchronized by setting a wait flag (Wait Flag). By using an instruction asynchronous execution policy, instructions may be executed in parallel, thereby increasing running efficiency. If the asynchronous execution policy is used in an example of the foregoing synchronous execution sequence, an effect is shown in FIG. 18. In an instruction asynchronous execution sequence, instructions are not order-preserved, and related instructions having a dependency relationship may be synchronized by using a wait instruction added by software. Control preparation overheads of fractal matrix multiplication may be hidden by using this asynchronous execution manner. An asynchronous execution manner applicable to a fractal matrix multiplication programming manner is designed.

A matrix multiplier is provided, where the matrix multiplier uses a controller to complete a matrix multiplication block division method, that is, an MNK fractal; and divide, by using control logic of an internal controller 604 in the matrix multiplier 60, a large matrix into identity matrices (to be specific, an X*L×L*Y matrix) for multiplication. The control logic of the controller 604 sends an identity matrix multiplication task to an operation circuit 603 in each clock cycle, so that data is executed in a pipeline manner, and operation units of X rows and Y columns operate in a full load state. Efficiency of matrix multiplication is increased, and an application effect of significantly improving a neural network algorithm is achieved. The matrix multiplier provided in this embodiment of the present invention may perform a convolution operation and an FC operation in a convolutional neural network.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL for short)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD for short), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A matrix multiplier, comprising:
   a first memory, configured to store a first matrix, wherein the first matrix is an M*K matrix;
   a second memory, configured to store a second matrix, wherein the second matrix is a K*N matrix;
   an operation circuit connected to the first memory and the second memory, wherein the operation circuit comprises operation units of X rows and Y columns, and each operation unit comprises a vector multiplication circuit and an addition circuit, wherein the vector multiplication circuit is configured to receive row vector data sent by the first memory and column vector data sent by the second memory, and multiply the two vectors; and the addition circuit is configured to add results obtained by multiplying the two vectors, and accumulate computation results of a same operation unit, to obtain an operation result of each operation unit; and
   a controller connected to the operation circuit, wherein the controller is configured to perform the following actions:
   dividing the first matrix into blocks in a unit of a sub-block whose size is X*L, to obtain S×R sub-blocks of a same size, wherein a sub-block in a row s and a column r of the S×R sub-blocks is denoted as $A_{sr}$, s=(1, 2, 3, . . . , and S), and r=(1, 2, 3, . . . , and R); and
   dividing the second matrix into blocks in a unit of a sub-block whose size is L*Y, to obtain R×T sub-blocks of a same size, wherein a sub-block in a row r and a column t in the R×T sub-blocks is denoted as $B_{rt}$, r=(1, 2, 3, . . . , and R), and t=(1, 2, 3, . . . , and T); wherein
   the controller is further configured to perform the following action:
   inputting a row x in X row vectors of any sub-block $A_{sr}$ and a column y in Y column vectors of a corresponding sub-block $B_{rt}$ into an operation unit in a row x and a column y in the operation units of X rows and Y columns, so as to perform an operation, wherein x=(1, 2, 3, . . . , and X), y=(1, 2, 3, . . . , and Y), and r in the any sub-block $A_{sr}$ and r in the corresponding sub-block $B_{rt}$ have an equal value.

2. The matrix multiplier according to claim 1, wherein the controller is specifically configured to perform the following action:
   inputting the row x in the X row vectors of the any sub-block $A_{sr}$ and the column y in the Y column vectors of the corresponding sub-block $B_{rt}$ into the operation unit in a row x and a column y in the operation units of X rows and Y columns in parallel in a same clock cycle, so as to perform the operation.

3. The matrix multiplier according to claim 1, wherein the controller is further configured to control row vectors of the any sub-block $A_{sr}$ to successively enter, in ascending order of x row numbers, a row x corresponding to the operation units of X rows and Y columns, wherein a difference between moments at which adjacent row vectors enter operation units in a same column and different rows is one clock cycle; and the controller is further configured to simultaneously control column vectors of the corresponding sub-block $B_{rt}$ to successively enter, in ascending order of y column numbers, a column y corresponding to the operation units of X rows and Y columns, wherein a difference between moments at which adjacent column vectors enter operation units in a same row and different columns is one clock cycle.

4. The matrix multiplier according to claim 1, wherein the controller is further configured to control:
   values of s and r to remain unchanged and a value of t to be changed in at least two consecutive sub-block multiplication computation cycles, so that the first memory reuses a same sub-block $A_{sr}$ within the at least two consecutive sub-block multiplication computation cycles, wherein the sub-block multiplication computation cycle is a time used by the operation units of X rows and Y columns to complete a matrix multiplication operation on one sub-block $A_{sr}$ and a corresponding sub-block $B_{rt}$.

5. The matrix multiplier according to claim 1, wherein the matrix multiplier further comprises a third memory connected to the operation circuit; and
   the controller is configured to control the operation units of X rows and Y columns to store operation results of the vector multiplication circuit and the addition circuit into the third memory.

6. The matrix multiplier according to claim 5, wherein the matrix multiplier further comprises: a fourth memory connected to the first memory and the second memory, and a fifth memory connected to the third memory; and
   the controller is further configured to control: before performing a multiplication operation on the first matrix and the second matrix, data sources of the first matrix and the second matrix to be moved from the fourth memory to the first memory and the second memory respectively, and the computation results to be moved from the third memory to the fifth memory.

7. The matrix multiplier according to claim 1, wherein the vector multiplication circuit comprises L multipliers, and the addition circuit comprises an adder tree with an input quantity being L+1.

8. The matrix multiplier according to claim 1, wherein the first memory, the second memory, the operation circuit, and the controller are connected by using a bus interface unit.

9. The matrix multiplier according to claim 1, wherein $$S = \begin{cases} M/X, & M\%X = 0 \\ \left[\frac{M}{X}\right]+1, & M\%X \neq 0 \end{cases}, \text{ and } R = \begin{cases} K/L, & K\%L = 0 \\ \left[\frac{K}{L}\right]+1, & K\%L \neq 0 \end{cases};$$

when M % X≠0, computation is not performed on a row (M+1) to a row (S*X−M) of the first matrix, and a value of a result is assigned 0; and when K % Y≠0, computation is not performed on a column (K+1) to a column (R*Y−K) of the first matrix, and a value of a result is assigned 0.

10. The matrix multiplier according to claim 1, wherein $$R = \begin{cases} K/L, & K\%L = 0 \\ \left[\frac{K}{L}\right]+1, & K\%L \neq 0 \end{cases}, \text{ and } T = \begin{cases} N/Y, & N\%Y = 0 \\ \left[\frac{N}{Y}\right]+1, & N\%Y \neq 0 \end{cases};$$

when K % Y≠0, computation is not performed on a column (K+1) to a column (R*Y−K) of the first matrix, and a value of a result is assigned 0; and when N % X≠0, computation is not performed on a row (N+1) to a row (T*X−N) of the first matrix, and a value of a result is assigned 0.

* * * * *